(12) United States Patent
Miura et al.

(10) Patent No.: US 9,030,895 B2
(45) Date of Patent: May 12, 2015

(54) MEMORY DEVICE WITH PIN REGISTER TO SET INPUT/OUTPUT DIRECTION AND BITWIDTH OF DATA SIGNALS

(75) Inventors: Seiji Miura, Hachioji (JP); Yoshinori Haraguchi, Chuo-ku (JP); Kazuhiko Abe, Chuo-ku (JP); Shoji Kaneko, Chuo-ku (JP); Akira Yabu, Chuo-ku (JP)

(73) Assignee: Micron Technology, Inc., Boise, ID (US)

( * ) Notice: Subject to any disclaimer, the term of this patent is extended or adjusted under 35 U.S.C. 154(b) by 957 days.

(21) Appl. No.: 12/510,633

(22) Filed: Jul. 28, 2009

(65) Prior Publication Data
US 2010/0030954 A1   Feb. 4, 2010

(30) Foreign Application Priority Data

Jul. 29, 2008  (JP) ................................ 2008-194871

(51) Int. Cl.
*G11C 7/00* (2006.01)
*G06F 13/42* (2006.01)

(52) U.S. Cl.
CPC ................................ *G06F 13/4217* (2013.01)

(58) Field of Classification Search
CPC .... G11C 7/1051; G11C 7/1078; G11C 7/106; G11C 7/1057; G11C 7/10; G11C 11/4096; G11C 7/22
USPC ............ 365/189.18, 189.19, 189.05; 711/104
See application file for complete search history.

(56) References Cited

U.S. PATENT DOCUMENTS

| | | | | |
|---|---|---|---|---|
| 6,002,268 | A * | 12/1999 | Sasaki et al. ..................... | 326/41 |
| 6,577,157 | B1 * | 6/2003 | Cheung et al. .................. | 326/38 |
| 7,426,586 | B2 * | 9/2008 | Dybsetter et al. ................ | 710/8 |
| 2008/0180116 | A1 * | 7/2008 | Fujiwara et al. ............... | 324/754 |
| 2010/0027354 | A1 * | 2/2010 | Matsui et al. ............. | 365/189.05 |
| 2010/0235554 | A1 * | 9/2010 | Chang et al. .................. | 710/104 |

FOREIGN PATENT DOCUMENTS

| | | |
|---|---|---|
| JP | 10-050054 A | 2/1998 |
| JP | 10-064257 A | 3/1998 |
| JP | 2005-235248 A | 9/2005 |

OTHER PUBLICATIONS

JESD79-2B, "DDR2 SDRAM Specification," Jan. 2005, JEDEC. 113 pages.*
NTU256M4DE, "1Gb DDR2 SDRAM," May 2008, Nanya. 79 pages.*

* cited by examiner

*Primary Examiner* — Tuan T Nguyen
*Assistant Examiner* — Khamdan Alrobaie
(74) *Attorney, Agent, or Firm* — Dorsey & Whitney LLP

(57) ABSTRACT

A random access memory includes a data signal line, a data-synchronization signal line for a data synchronization signal which provides a synchronization signal when data is transmitted to the data signal line, and a setting module. The setting module determines whether the data signal line is set to be a data signal line for common input/output use, a data signal line for output-only use, or a data signal line for input-only use, and further determines whether the data-synchronization signal line is set to be a data-synchronization signal line for common input/output use, a data-synchronization signal line for output-only use, or a data-synchronization signal line for input-only use.

16 Claims, 11 Drawing Sheets

Fig.6

| Command | CKE Previous cycle | CKE Current cycle | /CS | /RAS | /CAS | /WE | BA0 (A14) | BA1 (A15) | BA2 (A16) | A13 to A11 | A10 | A9 to A0 |
|---|---|---|---|---|---|---|---|---|---|---|---|---|
| PNRS | H | H | L | L | L | L | H | H | H | PIN OPCODE | | |
| MRS | H | H | L | L | L | L | L | L | L | MRS OPCODE | | |
| EMRS | H | H | L | L | L | L | H | L | L | EMRS OPCODE | | |
| REF | H | H | L | L | L | H | X | X | X | X | X | X |
| SELF | H | L | L | L | L | H | X | X | X | X | X | X |
| SELFX | L | H | H | X | X | X | X | X | X | X | X | X |
| PRE | H | H | L | L | H | L | BA | | | X | L | X |
| PALL | H | H | L | L | H | L | X | X | X | X | H | X |
| ACT | H | H | L | L | H | H | BA | | | RA | | |
| WRIT | H | H | L | H | L | L | BA | | | CA | L | CA |
| WRITA | H | H | L | H | L | L | BA | | | CA | H | CA |
| READ | H | H | L | H | L | H | BA | | | CA | L | CA |
| READA | H | H | L | H | L | H | BA | | | CA | H | CA |
| NOP | H | X | L | H | H | H | X | X | X | X | X | X |
| DESL | H | X | H | X | X | X | X | X | X | X | X | X |
| PDEN | H | L | H | X | X | X | X | X | X | X | X | X |
| PDENX | L | H | H | X | X | X | X | X | X | X | X | X |

PIN OPCODE

| | A13 | A12 | A11-A0 |
|---|---|---|---|
| AllPinRW | L | L | X |
| HalfPinRead | L | H | X |
| QtrPinRead : | H | L | X |
| QtrPinWrite : | H | H | X |

BA : Bank Address
RA : Row Address
CA : Column Address
H : HIGH
L : LOW
X : Don't Care

MEMORY DEVICE WITH PIN REGISTER TO SET INPUT/OUTPUT DIRECTION AND BITWIDTH OF DATA SIGNALS

BACKGROUND OF THE INVENTION

1. Field of the Invention

The present invention relates to information processing systems and semiconductor storage devices, and particularly to a beneficial technology to be applied to a system including a random access memory and an information processing device for controlling the random access memory.

2. Description of Related Art

For example, Japanese Patent Laid-Open No. 2005-235248 describes a semiconductor storage device which aims to reduce the time for a DMA test and to improve the inspection accuracy thereof. Specifically, in this semiconductor storage device, when the test is conducted at a low frequency, the IO terminal functions as an input/output terminal (a common mode), and when the test is conducted at a high frequency, one part of the IO terminal functions as an input terminal and the other part functions as an output terminal (a separate mode). Further, Japanese patent Laid-Open No. 10-50054 describes a semiconductor storage device which aims at the reduction of skew in read data on the side of a memory controller. Specifically, the semiconductor storage device includes an IO common mode and an IO separate mode, in which in the IO separate mode, data is inputted from an address terminal and outputted from an IO terminal. Furthermore, Japanese patent Laid-Open No. 10-64257 describes a semiconductor storage device which enables a high-speed read-modify-write for a 3D computer graphics buffer. Specifically, the semiconductor storage device includes a memory array which allows independent inputting and outputting of data during read/write, a circuit which decodes and outputs an address signal for reading data to the memory array, and a circuit which decodes and outputs a signal which is obtained by delaying the address signal for reading data by a predetermined number of clocks as an address signal for writing data, to the memory array.

Prior to the present application, the inventers of the present invention investigated the operation in an information processing system made up of an information processing device and a random access memory.

There are stored in the random access memory, though not specifically limited to, a communication control program to be processed in the information processing device, and a program and data for processing media such as MPEG, JPEG and graphics. Regarding the communication control program, the information processing device (for example, CPU: Central Processing Unit) reads out a communication control command stored in the random access memory and performs communication control. At this time, reading of commands from the random access memory will frequently take place. On the other hand, regarding the programs for processing media such as MPEG, JPEG and graphics, the information processing device reads the commands and data of these programs stored in the random access memory, processes the data according to a predetermined command in the information processing device, and writes the data into the random access memory. At this time, reading and writing of data from and into the random access memory will frequently take place in an alternate manner.

Therefore, to achieve a high-speed operation of a program for processing media, the data transfer speed while reading and writing data alternately take place is important, and to achieve a high-speed operation of a communication control program, the latency, until a cycle of data read is finished, is important. In a random access memory in which the data signal is configured to be bidirectional, that is, in a random access memory in which the data signal is controlled by a bidirectional buffer, when reading and writing data to and from a random access memory alternately take place at frequent intervals, the time for switching the bidirectional buffer increases thereby inevitably reducing the data transfer speed. That is, in generally known conventional random access memories, it is difficult to realize a high-speed data transfer and a low latency by flexibly coping with the program being executed in the information processing device.

Under such circumstances, the above described Japanese Patent Laid-Open No. 2005-235248 and Japanese patent Laid-Open No. 10-50054 describe a semiconductor storage device which aims at the reduction of testing time and read-data skew. However, since those devices have configurations specialized for desired objects, they are not configured to improve the efficiency of the program processing as described above. Further, although using the semiconductor storage device of Japanese Patent Laid-Open No. 10-64257 will make it possible to effectively realize a read-modify-write for the same address, it is difficult to flexibly improve the efficiency depending on various program processing as described above.

SUMMARY

The present invention seeks to solve one or more of the above problems, or to improve upon those problems at least in part.

In one embodiment, there is provided a system that includes a random access memory and an information processing device for performing data communication to and from the random access memory. The random access memory includes: a data signal line; a data-synchronization signal line for a data synchronization signal, a data synchronization signal which is a synchronization signal when data is transmitted to the data signal line; and a setting module. The setting module determines whether the data signal line is set to be a data signal line for common input/output use, a data signal line for output-only use, or a data signal line for input-only use, and further determines whether the data-synchronization signal line is set to be a data-synchronization signal line for common input/output use, a data-synchronization signal line for output-only use, or a data-synchronization signal line for input-only use.

BRIEF DESCRIPTION OF THE DRAWINGS

The above feature and advantages of the present invention will be more apparent from the following description of certain preferred embodiments taken in conjunction with the accompanying drawings, in which:

FIG. 6 is an explanatory diagram to show commands executed by a random access memory, and an example of a combination of signals for implementing the commands in the information processing system of FIG. 1;

DETAILED DESCRIPTION OF THE PREFERRED EMBODIMENTS

Figure 1:
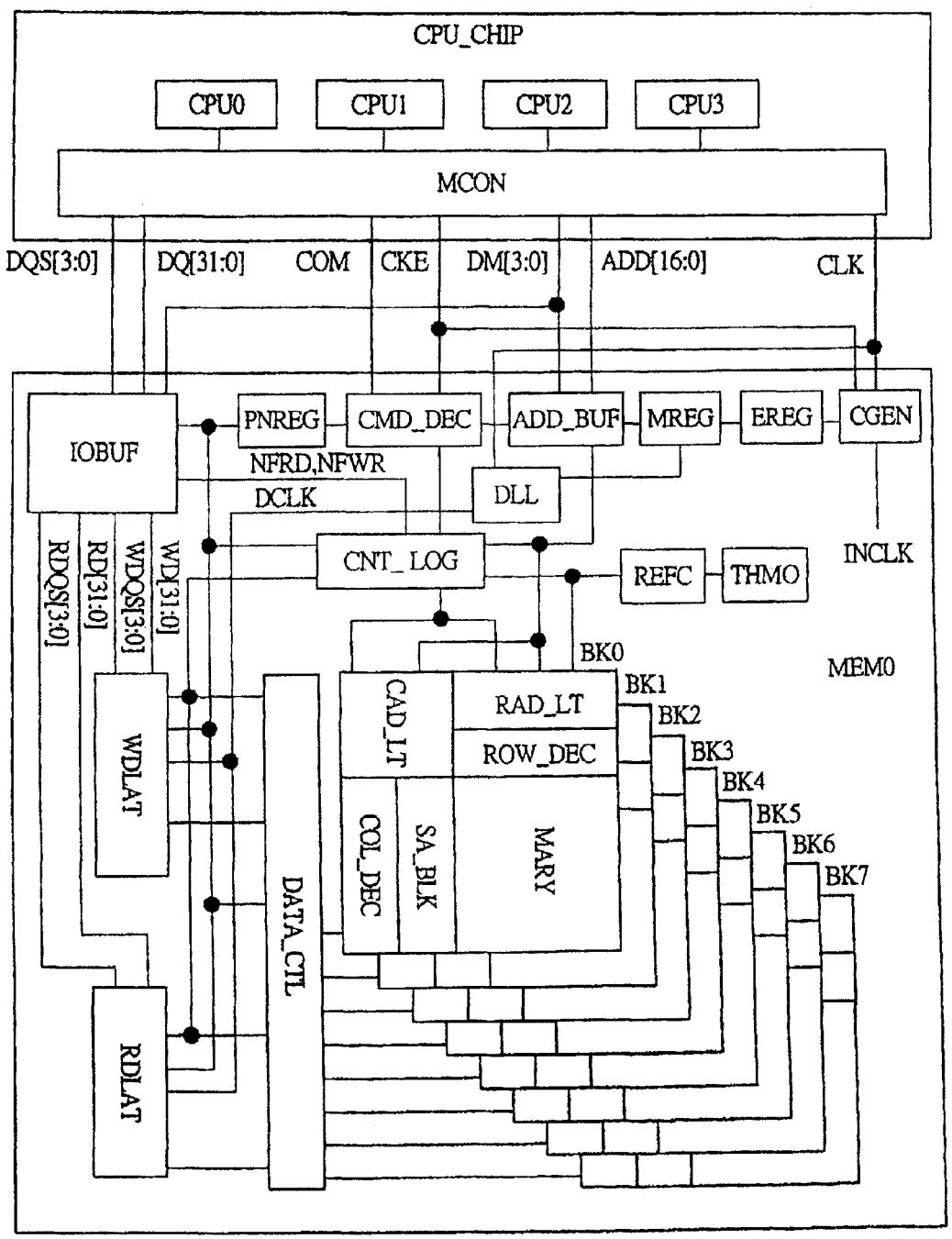
FIG. 1 is a block diagram to show an example of the information processing system according to exemplary embodiment 1.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Although, in the following exemplary embodiments, description will be made by dividing them into multiple sections or embodiments when desired for the sake of convenience, they are not unrelated to each other except where specifically stated, and are in the relationship that one may be a variant of a part or all of the other, details, or a supplementary explanation to the other. Moreover, in the following exemplary embodiments, when referring to a number or the like (including numbers, numerical values, quantities, ranges, etc.) of an element, the number will not be limited to the specific number and may be not more than or not less than the specific number except where specifically stated and where obviously limited to a particular number in theory.

Further, in the following exemplary embodiments, any component thereof (including elementary steps etc.) is not, needless to say, necessarily essential except where specifically stated and where obviously considered to be essential in theory. Similarly, in the following exemplary embodiments, when referring to the geometry, positional relationship, and the like of a component etc., that which is substantially analogous to or similar to the geometry and the like is intended to be included except where specifically stated and where obviously otherwise considered in theory. This is also true with the above described numerical values and ranges.

Hereafter, exemplary embodiments will be described in detail based on the drawings. It is noted that in all the drawings for describing the exemplary embodiments, like components are denoted by like reference characters as a general rule, and repetitive description thereof will be omitted. In the following exemplary embodiments, circuit elements making up each block are formed by, though not specifically limited to, an integrated circuit technology such as known CMOS (Complementary MOS transistor) etc. on a single semiconductor substrate such as of single-crystal silicon.

Exemplary Embodiment 1

Referring to FIGS. 1 to 9, description will be made on an information processing system of a first exemplary embodiment to which the present invention is applied.

FIG. 1 is a block diagram to show an example of the configuration of the information processing system according to the first exemplary embodiment of the present invention. The information processing system shown in FIG. 1 includes information processing device CPU_CHIP and random access memory MEM0. Each of the above described components will be described below, taking for example, though not specifically limited to, DDR-SDRAM (Double Data Rate-Synchronous Dynamic Random Access Memory) as random access memory MEM0.

Information processing device CPU_CHIP includes information processing circuits CPU0, CPU1, CPU2, and CPU3 and memory control circuit MCON. Information processing device CPU_CHIP is connected to random access memory MEM0 via memory control circuit MCON to perform data communication. Random access memory MEM0 includes clock generation circuit CGEN, mode register MREG, extended mode register EREG, address buffer ADD_BUF, command decoder CMD_DEC, pin register PNREG, IO buffer IOBUF, temperature sensor THMO, refresh control circuit REFC, control circuit CNT_LOG, write data buffer WDLAT, read data buffer RDLAT, data control circuit DATA_CTL, clock synchronization circuit DLL, and memory banks BK0 to BK7.

Each memory bank BK0 to BK7 includes row-address latch circuit RAD_LT, column-address latch circuit CAD_LT, row decoder ROW-DEC, column decoder COL_DEC, sense amplifier block SA_BLK, and memory array MARY. CPU_CHIP and MEM0 are interconnected by a clock signal line for clock signal CLK, a clock enable signal line for clock enable signal CKE, an address signal line for address signal ADD[16:0], a command signal line for command signal COM, a data-mask signal line for data mask signal DM[3:0], a data signal line for data signal DQ[31:0], and a data-synchronization signal line for data synchronization signal DQS[3:0].

Clock generation circuit CGEN generates internal clock signal INCLK from CLK inputted to random access memory MEM0. This INCLK is utilized in each block making up MEM0. Clock synchronization circuit DLL outputs data clock signal DCLK synchronized with inputted CLK. In mode register MREG, it is possible to set up, though not specifically limited to, a data read latency, a burst length, and the like, and in extended mode register EREG, it is possible to set up, though not specifically limited to, a drive capability of an output buffer, a temperature range of self refresh, an enable/disable of clock synchronization circuit DLL, and the like.

In pin register PNREG, it is possible to set the input/output direction and the bit width of data signals DQ[31:0]. For example, although not specifically limited to, four types of settings shown below are possible.

(Setting 1) All of data signal DQ[31:0] is set to be an input/output signal, and data synchronization signal DQS[3:0] is also set to be an input/output signal.

(Setting 2) Data signal DQ[31:16] is set to be an input-only signal and data signal DQ[15:0] to be an output-only signal, and data synchronization signal DQS[3:2] is set to be an input-only signal and data synchronization signal DQS[1:0] to be an output-only signal.

(Setting 3) Data signal DQ[31:8] is set to be an input-only signal and data signal DQ[7:0] to be an output-only signal, and data synchronization signal DQS[3:1] is set to be an input-only signal and data synchronization signal DQS[0] to be an output-only signal.

(Setting 4) Data signals DQ[31:24] is set to be an input-only signal and data signal DQ[23:0] to be an output-only signal, and data synchronization signal DQS[3] is set to be an input-only signal and data synchronization signal DQS[2:0] to be an output-only signal.

Next, an example operation of the information processing system of FIG. 1 will be described.

<Description of Operation Immediately After Power-On>

Figure 2:
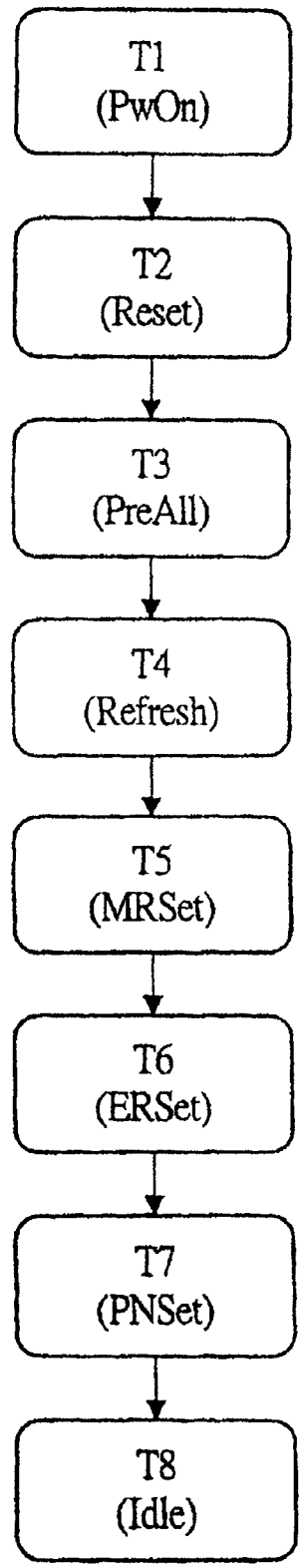
FIG. 2 is a flow diagram to show an example of an operation immediately after power supply is turned on in the information processing system of FIG. 1.

FIG. 2 is a flow diagram to show an example operation immediately after the power supply is turned on in the information processing system of FIG. 1. First, the power supply for random access memory MEM0 is turned on during period T1 (PwON), and resetting is performed during period T2 (Reset). The method of reset may be, though not specifically limited to, a method to automatically perform a reset in each built-in circuit, a method to provide an external reset terminal and perform a reset by using the reset terminal, or a method to perform a reset by inputting a reset command to MEM0 from information processing device CPU_CHIP via the signal line for command signal COM.

In period T3 (PreAll) during which reset is released, precharge-all command PALL is inputted to command decoder CMD_DEC from information processing device CPU_CHIP via the signal line for command signal COM. CMD_DEC decodes precharge-all command PALL and instructs control circuit CNT_LOG to perform precharge operations to all memory banks BK0 to BK7. Following the instruction from CMD_DEC, CNT_LOG performs precharge operation to all memory banks BK0 to BK7. In period T4 (Refresh) after the end of period T3, refresh command REF is inputted to command decoder CMD_DEC from information processing device CPU_CHIP via the signal line for command signal COM. CMD_DEC decodes refresh command REF and instructs control circuit CNT_LOG to perform refresh operations to all memory banks BK0 to BK7. Following instructions from CMD_DEC, CNT_LOG performs a refresh operation to all memory banks BK0 to BK7.

In period T5 (MRSet) after the end of period T4, mode-register set command MRS is inputted to command decoder CMD_DEC from information processing device CPU_CHIP via the signal line for command signal COM, and a mode set value to mode register MREG is inputted to address buffer ADD_BUF via the signal line for address signal ADD. CMD_DEC decodes this mode-register set command MRS and instructs control circuit CNT_LOG to set a mode set value for mode register MREG. Following instructions from CMD_DEC, CNT_LOG sets a mode set value in mode register MREG via address buffer ADD_BUF.

In period T6 (ERSet) after the end of period T5, extended-register set command EMRS is inputted to command decoder CMD_DEC from information processing device CPU_CHIP via the signal line for command signal COM, and a register set value to extended register EREG is inputted to address buffer ADD_BUF via the signal line for address signal ADD. CMD_DEC decodes this extended-register set command EMRS and instructs control circuit CNT_LOG to set a register set value for extended register EREG. Following the instruction from CMD_DEC, CNT_LOG sets a register set value in extended register EREG via address buffer ADD_BUF.

In period T7 (PNSet) after the end of period T6, pin-register set command PNRS is inputted to command decoder CMD_DEC from information processing device CPU_CHIP via the signal line for command signal COM, and a set value to pin register PNREG is inputted to address buffer ADD_BUF via the signal line for address signal ADD. CMD_DEC decodes pin-register set command PNRS and instructs control circuit CNT_LOG to set a pin set value for pin register PNREG. Following instructions from CMD_DEC, CNT_LOG sets a pin set value in pin register PNREG via address buffer ADD_BUF. In and after period T8 (Idle) after the end of period T7, random access memory MEM0 moves into an idle state and is brought to wait for a request from information processing device CPU_CHIP.

<Description of the Operation to Set Register Value in Pin Register PNREG>

Figure 3:
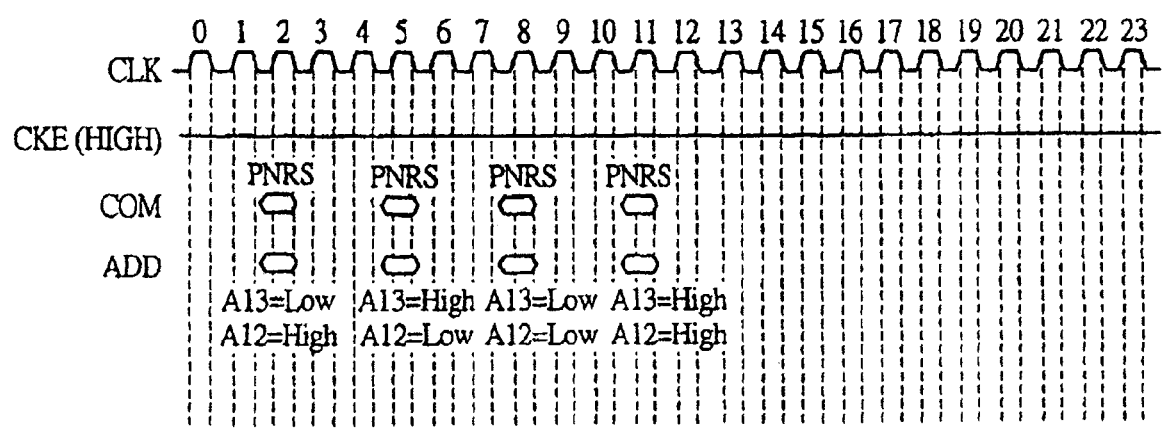
FIG. 3 is a waveform diagram to show an example of an operation when the setting on pin register is performed in the information processing system of FIG. 1.

Also in and after period T8 (Idle) shown in FIG. 2, information processing device CPU_CHIP can reset a register value in pin register PNREG of random access memory MEM0. FIG. 3 is a waveform diagram to show an example of an operation when performing the setting in pin register PNREG in the information processing system of FIG. 1.

In FIG. 3, first, pin-register set command PNRS is inputted from the signal line for command signal COM, and A13 (ADD[13])=Low and A12(ADD[12])=High are inputted as address signal ADD. These are taken into random access memory MEM0 at a rising edge of clock signal CLK and register values of A13=Low and A12=High are set in pin register PNREG. In this case, according to the register values set in pin register PNREG, IO buffer IOBUF sets data signal DQ[13:16] to be an input-only signal, and data signal DQ[15:0] to be an output-only signal, as well as setting data synchronization signal DQS[3:2] to be an input-only signal and data synchronization signal DQS[1:0] to be an output-only signal.

Then, pin-register set command PNRS is inputted from the signal line for command signal COM, and A13=High and A12=Low are inputted as address signal ADD. These are taken into random access memory MEM0 at a rising edge of clock signal CLK and register values of A13=High and A12=Low are set in pin register PNREG. In this case, according to the register values set in pin register PNREG, IO buffer IOBUF sets data signal DQ[31:8] to be an input-only signal, and data signal DQ[7:0] to be an output-only signal, as well as setting data synchronization signal DQS[3:1] to be an input-only signal, and data synchronization signal DQS[0] to be an output-only signal.

Next, pin-register set command PNRS is inputted from the signal line for command signal COM and A13=Low and A12=Low are inputted as address signal ADD. These are taken into random access memory MEM0 at a rising edge of clock signal CLK and register values of A13=Low and A12=Low are set in pin register PNREG. In this case, according to the register values set in pin register PNREG, IO buffer IOBUF sets all of data signal DQ[31:0] to be an input/output signal and also sets data synchronization signal DQS[3:0] to be an input/output signal.

Then, pin-register set command PNRS is inputted from the signal line for command signal COM and A13=High and A12=High are inputted as address signal ADD. These are taken into random access memory MEM0 at a rising edge of clock signal CLK and register values of A13=High and A12=High are set in pin register PNREG. In this case, according to the register value set in pin register PNREG, IO buffer IOBUF sets data signal DQ[31:24] to be an input-only signal, and data signal DQ[23:0] to be an output-only signal, as well as setting data synchronization signal DQS[3] to be an input-only signal, and data synchronization signal DQS[2:0] to be an output only signal.

Since, in this way, information processing device CPU_CHIP can reset pin register PNREG, it can flexibly adapt to achieve a high-speed data transfer depending on the program to be executed in information processing device CPU_CHIP.

<Description of Read and Write Operations>

Figure 4A:
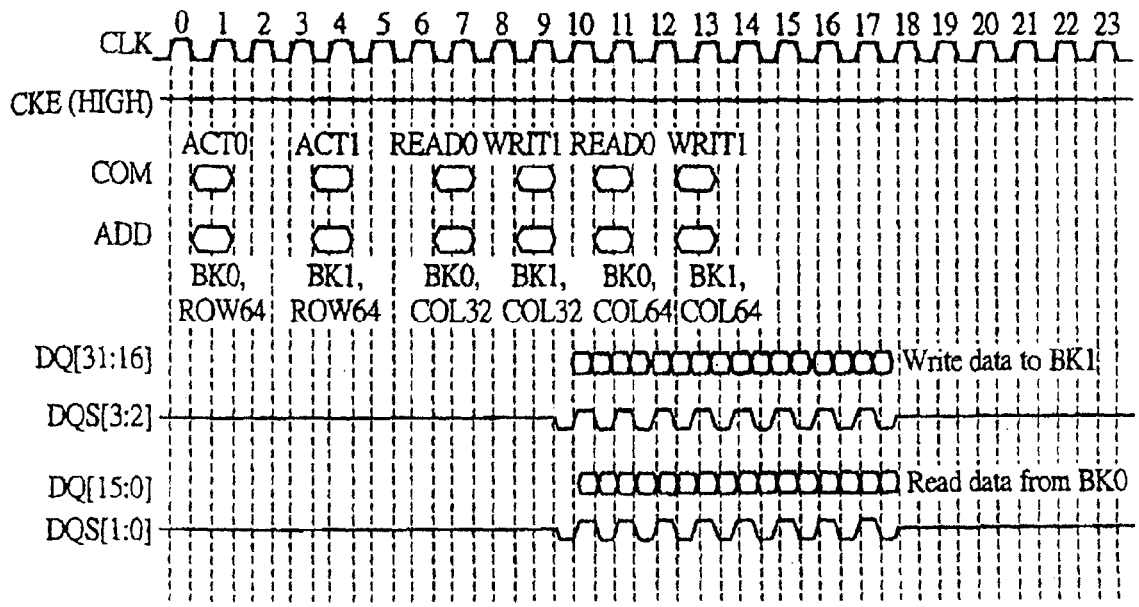
FIG. 4*a* is a waveform diagram to show an example of an operation when read and write operations alternately take place in the information processing system of FIG. 1.
Figure 4B:
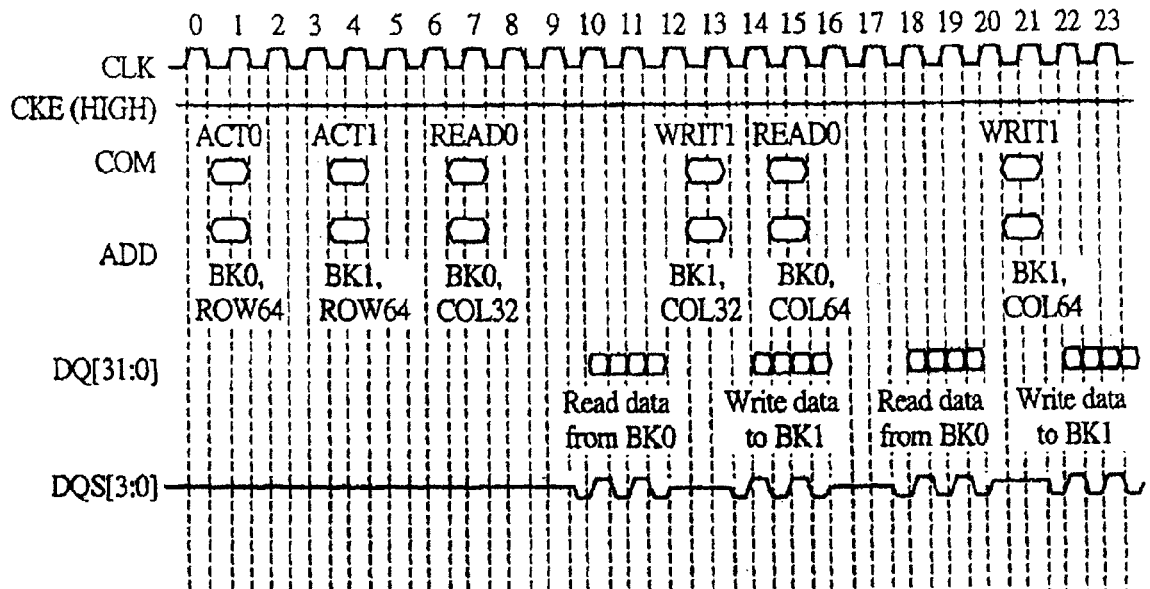
FIG. 4b is a waveform diagram to show an example of an operation when read and write operations alternately take place in the information processing system of FIG. 1.

FIG. 4 shows an example operation when read and write operations alternately take place in the information processing system of FIG. 1, wherein FIGS. 4a and 4b are waveform diagrams in which different settings of pin register PNREG are used respectively. In FIGS. 4a and 4b, when random access memory MEM0 is in an idle state, information processing device CPU_CHIP alternately issues, to MEM0, a read command to read from memory bank 0 (BK0) and a write command to write into memory bank 1 (BK1).

In FIGS. 4a and 4b, though not specifically limited to, a data read latency is set to 3 in advance in mode register MREG, and the drive capability of the output buffer is set to normal, the temperature range of self refresh operation is set to 0 to 95° C., and clock synchronization circuit DLL is set to enabled in extended mode register EREG. Further, in FIG. 4a, the burst length is set to 8 in mode register MREG in advance and in FIG. 4b, the burst length is set to 4. Furthermore, in FIG. 4a, data signal DQ[31:16] is set to be an input-only signal, data signal DQ[15:0] to be an output-only signal, data synchronization signal DQS[3:2] to be an input-only signal, and data synchronization signal DQS[1:0] to be an output-only signal, in pin register PNREG. On the other hand, in FIG. 4b, data signal DQ[31:0] is set to be an input/output signal and data synchronization signal DQS[3:0] is also set to be an input/output signal in pin register PNREG.

Under such settings, in FIG. 4a, first information processing device CPU_CHIP outputs, toward random access memory MEM0, bank active command ACT (ACT0) to command decoder CMD_DEC via the signal line for command signal COM in synchronization with clock signal CLK. Moreover, in the same cycle, information processing device CPU_CHIP outputs bank address (BK0) and row address (ROW64) to address buffer ADD_BUF through the signal line for address signal ADD. CMD_DEC decodes bank active command ACT0 and instructs control circuit CNT_LOG to activate a memory bank. According to the instruction of memory bank activation inputted into CNT_LOG and bank address (BK0), memory bank 0 (BK0) is selected. Row address ROW64 is transferred to row-address latch circuit RAD_LT of selected BK0 through address buffer ADD_BUF, and the amount of one page (though not specifically limited to, 8192 bits) of a memory cell corresponding to row address ROW64 is activated to be read out into sense amplifier block SA_BLK by row decoder ROW_DEC.

Next, information processing device CPU_CHIP outputs, toward random access memory MEM0, bank active command ACT (ACT1) to command decoder CMD_DEC via the signal line for command signal COM in synchronization with clock signal CLK. Moreover, in the same cycle, information processing device CPU_CHIP outputs bank address (BK1) and row address (ROW64) to address buffer ADD_BUF through the signal line for address signal ADD. CMD_DEC decodes bank active command ACT1 and instructs control circuit CNT_LOG to activate a memory bank. According to the instruction of memory bank activation inputted into CNT_LOG and bank address (BK1), memory bank 1 (BK1) is selected. Row address ROW64 is transferred to row-address latch circuit RAD_LT of selected BK1 through ADD_BUF, and the amount of one page (though not specifically limited to, 8192 bits) of a memory cell corresponding to row address ROW64 is activated to be read out into sense amplifier block SA_BLK by row decoder ROW_DEC.

Next, information processing device CPU_CHIP outputs, toward random access memory MEM0, read command READ (READ0) to command decoder CMD_DEC via the signal line for command signal COM in synchronization with clock signal CLK. Moreover, in the same cycle, information processing device CPU_CHIP outputs bank address (BK0) and column address COL32 to address buffer ADD_BUF through the signal line for address signal ADD. CMD_DEC decodes read command READ0 and instructs control circuit CNT_LOG to read data from a memory bank. According to the instructions to read data inputted to CNT_LOG and bank address (BK0), memory bank 0 (BK0) is selected. Moreover, according to the instructions to read data from control circuit CNT_LOG, data control circuit DATA_CTL provides a global data signal from sense amplifier block SA_BLK of memory bank 0 (BK0) to read data buffer RDLAT.

Column address COL32 is transferred to column-address latch circuit CAD_LT of selected BK0 through ADD_BUF, and 16 bytes of data whose starting address is column address COL32 are read out from sense amplifier block SA_BLK of memory bank 0 (BK0) to be transferred to read data buffer RDLAT via data control circuit DATA_CTL by column decoder COL_DEC. A value of pin register PNREG and data clock signal DCLK from clock synchronization circuit DLL are inputted to read data buffer RDLAT and these are utilized to create read-data synchronization signal RDQS[1:0]. The data within RDLAT is transferred to IO buffer IOBUF in synchronization with read-data synchronization signal RDQS[1:0] through the signal line for read data signal RD[15:0]. Upon receipt of these signals, IOBUF outputs 16 bytes of data as data signal DQ[15:0] along with data synchronization signal DQS[1:0] from the signal line for data signal DQ[15:0] to CPU_CHIP.

Next, information processing device CPU_CHIP outputs, toward random access memory MEM0, write command WRIT (WRIT1) to command decoder CMD_DEC via the signal line for command signal COM in synchronization with clock signal CLK. Moreover, in the same cycle, bank address (BK1) and column address COL32 are inputted to address buffer ADD_BUF through the signal line for address signal ADD, and thereafter 16 bytes of write data are successively outputted to IO buffer IOBUF from the signal line for data signals DQ[31:16] as data signal DQ[31:16] in synchronization with data synchronization signal DQS[3:2]. CMD_DEC decodes write command WRIT1 and instructs control circuit CNT_LOG to perform data writing to a memory bank.

IO buffer IOBUF transfers the inputted write data to write-data buffer WDLAT through the signal line for write data signal WD[31:16] in synchronization with write-data synchronization signal WDQS[3:2]. Further, according to the instruction to write data inputted into control circuit CNT_LOG, and bank address (BK1), memory bank 1 (BK1) is selected. Moreover, according to the instruction to write data from control circuit CNT_LOG, data control circuit DATA_CTL provides a global data signal from sense amplifier block SA_BLK of memory bank 1 (BK1) to write data buffer WDLAT.

Column address COL32 is transferred to column-address latch circuit CAD_LT of selected BK1 through address buffer ADD_BUF, and 16 bytes of write data stored in write data buffer WDLAT whose starting address is column address COL32 is transferred to sense amplifier block SA_BLK of BK1 through data control circuit DATA_CTL by column decoder COL_DEC to be further written into memory array MARY via sense amplifier block SA_BLK.

Next, information processing device CPU_CHIP outputs, toward random access memory MEM0, read command READ (READ0) to command decoder CMD_DEC via the signal line for command signal COM in synchronization with clock signal CLK. Moreover, in the same cycle, bank address (BK0) and column address COL64 are outputted to address buffer ADD_BUF through the signal line for address signal ADD. CMD_DEC decodes read command READ0 and instructs control circuit CNT_LOG to read data from the memory bank. According to the instructions to read data inputted to CNT_LOG and bank address (BK0), memory bank 0 (BK0) is selected. Further, according to the instructions to read data from control circuit CNT_LOG, data control circuit DATA_CTL provides a global data signal from sense amplifier block SA_BLK of memory bank 0 (BK0) to read data buffer RDLAT.

Column address COL64 is transferred to column-address latch circuit CAD_LT of selected memory bank 0 (BK0) through ADD_BUF, and 16 bytes of data whose starting address is column address COL64 are read out from sense amplifier block SA_BLK of BK0 to be transferred to read data buffer RDLAT via data control circuit DATA_CTL by column decoder COL_DEC. A value of pin register PNREG and data clock signal DCLK from clock synchronization circuit DLL are inputted to read data buffer RDLAT and these are utilized to create read-data synchronization signal RDQS[1:0]. The data within RDLAT is transferred to IO buffer IOBUF as read data signal RD[15:0] in synchronization with read-data synchronization signal RDQS[1:0] through the signal line for read data signal RD[15:0]. Upon receipt of these signals, IOBUF outputs, to CPU_CHIP, 16 bytes of data as data signals DQ[15:0] along with data synchronization signals DQS[1:0] from the signal line for data signal DQ[15:0].

Next, information processing device CPU_CHIP outputs, toward random access memory MEM0, write command WRIT (WRIT1) to command decoder CMD_DEC via the signal line for command signal COM in synchronization with clock signal CLK. Moreover, in the same cycle, bank address (BK1) and column address COL64 are inputted to address buffer ADD_BUF through the signal line for address signal ADD, and thereafter 16 bytes of write data are successively outputted to IO buffer IOBUF from the signal line for data signal DQ[31:16] as data signals DQ[31:16] in synchronization with data synchronization signals DQS[3:2]. CMD_DEC decodes write command WRIT1 and instructs control circuit CNT_LOG to perform data writing to a memory bank.

IO buffer IOBUF transfers the inputted write data to write data buffer WDLAT as write data signal WD[31:16] through the signal line for write data signal WD[31:16] in synchronization with write-data synchronization signal WDQS[3:2]. Moreover, according to the instruction of data write inputted into control circuit CNT_LOG and bank address (BK1), memory bank 1 (BK1) is selected. Further, according to the instructions to write data from control circuit CNT_LOG, data control circuit DATA_CTL provides a global data signal from sense amplifier block SA_BLK of memory bank 1 (BK1) to write data buffer WDLAT.

Column address COL64 is transferred to column-address latch circuit CAD_LT of selected BK1 through address buffer ADD_BUF, and 16 bytes of write data stored in write data buffer WDLAT whose starting address is column address COL64 are transferred to sense amplifier block SA_BLK of memory bank 1 (BK1) through data control circuit DATA_CTL by column decoder COL_DEC to be further written into memory array MARY via sense amplifier block SA_BLK.

As shown in FIG. 4a, by setting one half of data signals DQ[31:0] to be input-only and the remaining half to be output-only, and by causing the memory bank for performing writing and the memory bank for performing reading to operate in a different manner, to concurrently performing a write operation and a read operation is made possible. Here, since switching between the writing operation and reading operation will not take place in each of data signals DQ[31:0], it is possible to, after writing a burst length of data, further write another burst length of data in succession, and similarly it is possible to, after reading a burst length of data, further read another burst length of data in succession. Therefore, realizing a high-speed data transfer without inefficiency is made possible.

On the other hand, in FIG. 4b, as in the case of FIG. 4a, each command toward random access memory MEM0 has been issued from information processing device CPU_CHIP. However, in contrast to FIG. 4a, since data signal DQ[31:0] and data synchronization signal DQS[3:0] are set to be input/output signals, it is necessary to, after performing the reading of 16 bytes of data from memory bank 0 (BK0), wait for a predetermined number of cycles before performing the writing of 16 bytes of data into memory bank 1 (BK1). Moreover, thereafter as well, it is necessary to perform the reading of 16 bytes of data from BK0 and the writing of 16 bytes of data into BK1 while interposing a predetermined number of wait cycles therebetween. Thus, consequently, the data transfer rate will be decreased compared with the case of FIG. 4a.

As so far described, when the reading operation and writing operation from and to random access memory MEM0 take place in an alternate fashion, since setting data signal DQ[31:16] to be an input-only data signal, data signal DQ[15:0] to be an output-only data signal, data synchronization signal DQS[3:21] to be an input-only signal, and data synchronization signal DQS[1:0] to be an output-only signal in pin register PNREG will enable separating data reading signal from data writing signal and performing a data read operation and a data write operation independently, any switching time between reading data and writing data will not occur and therefore a high-speed data transfer can be achieved. As a result, it becomes possible to execute programs at a high-speed particularly for media processing in which write operation and read operation alternately take place, such as MPEG, JPEG, and graphics.

Figure 5A:
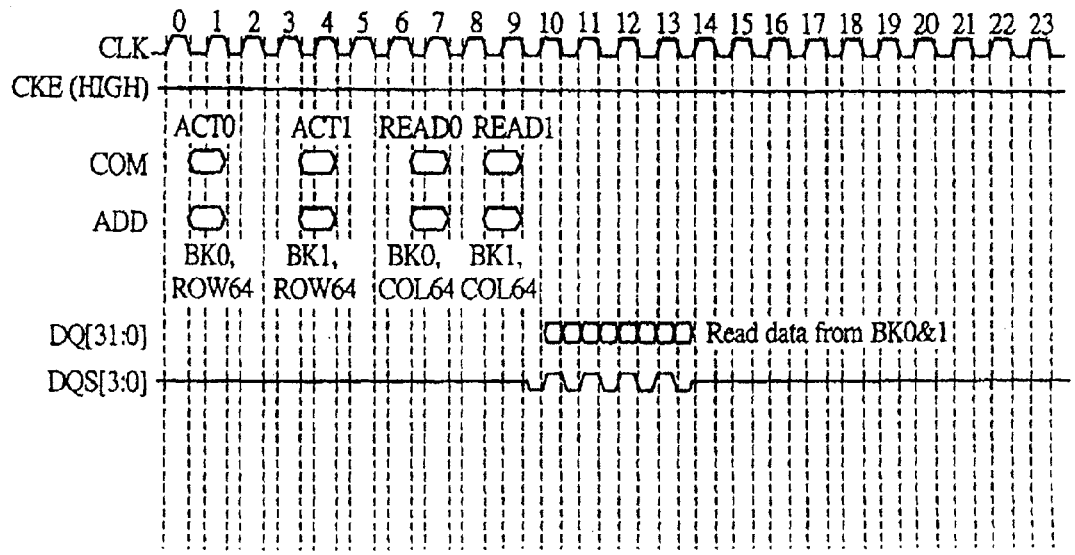
FIG. 5a is a waveform diagram to show an example of an operation when read operations take place successively in the information processing system of FIG. 1.
Figure 5B:
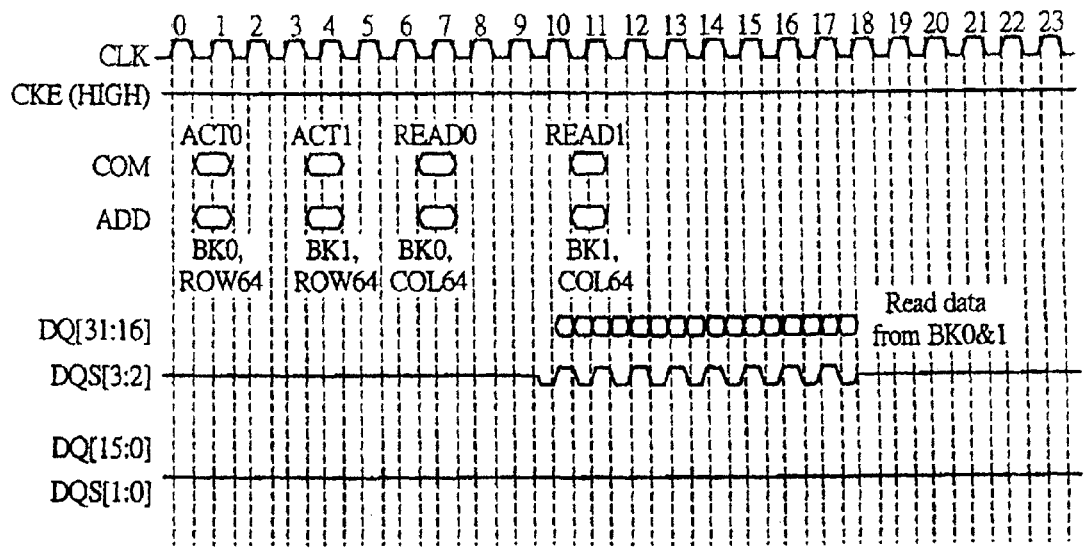
FIG. 5b is a waveform diagram to show an example of an operation when read operations take place successively in the information processing system of FIG. 1.

FIG. 5 shows an example operation when read operations take place successively in the information processing system of FIG. 1, wherein FIGS. 5a and 5b are waveform diagrams in which different settings of pin register PNREG are used respectively. In FIGS. 5a and 5b, when random access memory MEM0 is in an idle state, CPU_CHIP issues a read command of memory bank 0 (BK0) and memory bank 1 (BK1) to MEM0.

Although not specifically limited, in FIGS. 5a and 5b, data read latency is set to 3 in mode register MREG; and the drive capability of output buffer is set to normal, the temperature range of self refresh operation is set to 0 to 95° C., and clock synchronization circuit DLL is set to be enabled in extended mode register EREG, in advance. Moreover, in FIG. 5a, the burst length is set to 4 in mode register MREG in advance, and in FIG. 5b, the burst length is set to 8. Further, in FIG. 5a, data signal DQ[31:0] is set to be an input/output signal and data synchronization signal DQS[3:0] is also set to be an input/output signal in pin register PNREG. On the other hand, in FIG. 5b, data signal DQ[31:16] is set to be an input-only signal, data signal DQ[15:0] to be an output-only signal, data synchronization signal DQS[3:2] to be an input-only signal, and data synchronization signal DQS[1:0] to be an output-only signal, in pin register PNREG.

In such settings, in FIG. 5a, first, information processing device CPU_CHIP outputs, toward random access memory MEM0, bank active command ACT (ACT0) to command decoder CMD_DEC through the signal line for command signal COM in synchronization with clock signal CLK. Further, in the same cycle, information processing device CPU_CHIP outputs bank address (BK0) and row address ROW64 to address buffer ADD_BUF through the signal line for address signal ADD. CMD_DEC decodes bank active command ACT0 and instructs control circuit CNT_LOG to activate a memory bank. According to the instruction of memory bank activation inputted to CNT_LOG and bank address (BK0), memory bank 0 (BK0) is selected. Row address ROW64 is transferred to row-address latch circuit RAD_LT of selected BK0 through ADD_BUF, and the amount of one page of (though not specifically limited to, 8192 bits of a memory cell corresponding to row address ROW64 is activated by row decoder ROW_DEC to be read out into sense amplifier block SA_BLK.

Next, information processing device CPU_CHIP outputs, toward random access memory MEM0, bank active command ACT (ACT1) to command decoder CMD_DEC through the signal line for command signal COM in synchronization with clock signal CLK. Further, in the same cycle, information processing device CPU_CHIP outputs bank address (BK1) and row address ROW64 to address buffer ADD_BUF through the signal line for address signal ADD. CMD_DME decodes bank active command ACT1 and instructs control circuit CNT_LOG to activate a memory bank. According to the instruction of memory bank activation inputted into control circuit CNT_LOG and bank address (BK1), memory bank 1 (BK1) is selected. Row address ROW64 is transferred to row-address latch circuit RAD_LT of selected BK1 through address buffer ADD_BUF, and the amount of one page of (though not specifically limited to, 8192 bits) a memory cell corresponding to row address ROW64 is activated by row decoder ROW_DEC to be read out into sense amplifier block SA_BLK.

Next, information processing device CPU_CHIP outputs, toward random access memory MEM0, read command READ (READ0) to command decoder CMD_DEC via the signal line for command signal COM in synchronization with clock signal CLK. Moreover, in the same cycle, information processing device CPU_CHIP outputs bank address (BK0) and column address COL64 to address buffer ADD_BUF through the signal line for address signal ADD. CMD_DEC decodes this read command READ0 and instructs control circuit CNT_LOG to read data from the memory bank. According to the instructions to read data inputted into control circuit CNT_LOG and bank address (BK0), memory bank 0 (BK0) is selected.

Moreover, according to the data read instruction from control circuit CNT_LOG, data control circuit DATA_CTL provides a data signal from sense amplifier block SA_BLK of memory bank 0 (BK0) to read data buffer RDLAT. Column address COL64 is transferred to column-address latch circuit CAD_LT of selected BK0 through address buffer ADD_BUF, and 16 bytes of data whose starting address is column address COL64 are read out from sense amplifier block SA_BLK of BK0 by column decoder COL_DEC to be transferred to read data buffer RDLAT via data control circuit DATA_CTL.

A value of pin register PNREG and data clock signal DCLK from clock synchronization circuit DLL are inputted to read data buffer RDLAT and these are utilized to create read-data synchronization signals RDQS[3:0]. The data within RDLAT is successively transferred to IO buffer IOBUF as read data signal RD[31:0] in synchronization with read-data synchronization signal RDQS[3:0] through the signal line for read data signal RD[31:0]. Upon receipt of these signals, IOBUF outputs, toward information processing device CPU_CHIP, 16 bytes of data as data signals DQ[31:0] along with data synchronization signals DQS[3:0] from the signal line for data signal DQ[31:0].

Next, information processing device CPU_CHIP outputs, toward random access memory MEM0, read command READ (READ1) to command decoder CMD_DEC via the signal line for command signal COM in synchronization with clock signal CLK. Moreover, in the same cycle, bank address (BK1) and column address COL64 are outputted to address buffer ADD_BUF through the signal line for address signal ADD. CMD_DEC decodes read command READ1 and instructs control circuit CNT_LOG to read data from the memory bank. According to the instructions to read data inputted into CNT_LOG and bank address (BK0), memory bank 1 (BK1) is selected.

Moreover, according to the data read instruction from control circuit CNT_LOG, data control circuit DATA_CTL provides a data signal from sense amplifier block SA_BLK of memory bank 1 (BK1) to read data buffer RDLAT. Column address COL64 is transferred to column-address latch circuit CAD_LT of selected BK1 through ADD_BUF, and 16 bytes of data whose starting address is column address COL64 are read out from sense amplifier block SA_BLK of BK1 by column decoder COL_DEC to be transferred to read data buffer RDLAT via data control circuit DATA_CTL.

A value of pin register PNREG and data clock signal DCLK from clock synchronization circuit DLL are inputted to read data buffer RDLAT and these are utilized to create read-data synchronization signals RDQS[3:0]. The data within RDLAT is successively transferred to IO buffer IOBUF as read data signal RD[31:0] in synchronization with read-data synchronization signal RDQS[3:0] through the signal line for read data signal RD[31:0]. Upon receipt of these signals, IOBUF successively outputs 16 bytes of data as data signals DQ[31:0] along with data synchronization signals DQS[3:0] from the signal line for data signal DQ toward information processing device CPU_CHIP.

On the other hand, in FIG. 5b, as in the case of FIG. 5a, each command toward random access memory MEM0 was issued from information processing device CPU_CHIP. However, in contrast to FIG. 5a, since only data signal DQ[31:16] is set as an output signal, the data width becomes halved thereby taking twice as much time for data to be output.

As so far described, when read operations from random access memory MEM0 successively take place, since setting data signal DQ[31:0] to be an input/output signal and data synchronization signal DQS[3:0] to be an input/output signal in pin register PINREG will result in the amount of data which can be read at a time being 32 bits, the latency, until the data read is completed, will become minimum. This will enable high-speed execution of processing in which read operations successively take place, particularly such as communication control programs. It is noted that in a case where operations of writing data into random access memory MEM0 successively take place as well, since the amount of data which can be written at a time becomes 32 bits, it is possible, needless to say, to perform data writing at a high speed.

Further, as described in FIG. 3, since information processing device CPU_CHIP can reset pin register PNREG of random access memory MEM0, by appropriately resetting pin register PNREG depending on the program to be executed in CPU_CHIP, realizing a high-speed data transfer and a minimum read latency in various execution programs are made possible.

<Description of Combination of Symbols to Implement Command>

FIG. 6 is an explanatory diagram to show an example of commands executed by random access memory MEM0 and the combination of signals for implementing the commands. Hereafter, supposing the clock cycle time when inputting each command is N, description will be made on each command.

[1] Combination of Signals for Pin-Register Set Command PNRS

CKE of previous clock cycle time (N−1)=High, CKE of current clock cycle time (N)=High, /CS=Low, /RAS=Low, /CAS=Low, /WE=Low, bank address signal BA0 (A14, ADD [14])=High, bank address signal BA1 (A15, ADD[15])=High, and bank address signal BA2 (A16, ADD[16])=High. Here, row/column address signals A13(ADD[13]) to A0(ADD[0]) are operation codes PINOPCODE, which are values to be set in pin register PNREG by pin-register set command PNRS and are given as shown by, though not specifically limited to, (a) to (d) below.

(a) A13=Low and A12=Low: all of data signal DQ[31:0] is set to be an input/output signal and data synchronization signal DQS[3:0] is set to be an input/output signal as well.
(b) A13=Low and A12=High: data signal DQ[31:16] is set to be an input-only signal, data signal DQ[15:0] is set to be an output-only signal, data synchronization signal DQS[3:2] is set to be an input-only signal, and data synchronization signal DQS[1:0] is set to be an output-only signal.
(c) A13=High and A12=Low: data signal DQ[31:8] is set to be an input-only signal, data signal DQ[7:0] is set to be an output-only signal, data synchronization signal DQS[3:1] is set to be an input-only signal, and data synchronization signal DQS[0] is set to be an output-only signal.
(d) A13=High and A12=High: data signal DQ[31:24] is set to be an input-only signal, data signal DQ[23:0] is set to be an output-only signal, data synchronization signal DQS[3] is set to be an input-only signal, and data synchronization signal DQS[2:0] is set to be an output-only signal.

[2] Combination of Signals for Mode-Register Set Command MRS

CKE of previous clock cycle time (N−1)=High, CKE of current clock cycle time (N)=High, /CS=Low, /RAS=Low, /CAS=Low, /WE=Low, bank address signal BA0=Low, bank address signal BA1=Low, and bank address signal BA2=Low. Here, row/column address signals A13 to A0 are operation codes MRSOPCODE, which are values to be set in mode register MREG by mode-register set command MRS and are given as shown by, though not specifically limited to, (a) to (e) below.

(a) A2=Low, A1=High, and A0=Low: the burst length is set to 4.
(b) A2=Low, A1=High, and A0=High: the burst length is set to 8.
(c) A6=Low, A5=High, and A4=High: the read latency is set to 3 clock cycles.
(d) A6=High, A5=High, and A4=Low: the read latency is set to 4 clock cycles.
(e) A6=High, A5=Low, and A4=High: the read latency is set to 5 clock cycles.

[3] Combination of Signals for Extended-Register Set Command EMRS

CKE of previous clock cycle time (N−1)=High, CKE of current clock cycle time (N)=High, /CS=Low, /RAS=Low, /CAS=Low, /WE=Low, bank address signal BA0=High, bank address signal BA1=Low, and bank address signal BA2=Low. Here, row/column address signals A13 to A0 are operation codes EMRSOPCODE, which are values to be set in extended register EREG by extended-register set command EMRS and are given as shown by, though not specifically limited to, (a) to (d) below.

(a) A1=Low: the drive capability of the output buffer is set to normal.
(b) A1=High: the drive capability of the output buffer is set to weak.
(c) A7=Low: the guaranteed temperature range of self refresh is set from 0° C. to 75° C.
(d) A7=High: the guaranteed temperature range of self refresh is set from 0° C. to 95° C.

[4] Combination of Signals for Refresh Command REF

CKE of previous clock cycle time (N−1)=High, CKE of current clock cycle time (N)=High, /CS=Low, /RAS=Low, /CAS=Low, and /WE=High.

[5] Combination of Signals for Self Refresh/Entry Command SELF

CKE of previous clock cycle time (N−1)=High, CKE of current clock cycle time (N)=Low, /CS=Low, /RAS=Low, /CAS=Low, and /WE=High.

[6] Combination of Signals for Self-Refresh Release Command SELFX

CKE of previous clock cycle time (N−1)=Low, CKE of current clock cycle time (N)=High, and /CS=High.

[7] Combination of signals for precharge command PRE

CKE of previous clock cycle time (N−1)=High, CKE of current clock cycle time (N)=High, /CS=Low, /RAS=Low, /CAS=High, /WE=Low, and A10=Low. In this case, a precharge operation is performed for memory banks BK0 to BK7 selected by bank address signals BA0, BA1, and BA2.

[8] Combination of Signals for Precharge All Command PALL

CKE of previous clock cycle time (N−1)=High, CKE of current clock cycle time (N)=High, /CS=Low, /RAS=Low, /CAS=High, /WE=Low, and A10=High.

[9] Combination of Signals for Bank Active Command ACT

CKE of previous clock cycle time (N−1)=High, CKE of current clock cycle time (N)=High, /CS=Low, /RAS=Low, /CAS=High, and /WE=High. In this case, row addresses RA selected by row/column address signals A13 to A0 in memory banks BK0 to BK7 selected by bank address signals BA0, BA1, and BA2 are activated.

[10] Combination of Signals for Write Command WRIT

CKE of previous clock cycle time (N−1)=High, CKE of current clock cycle time (N)=High, /CS=Low, /RAS=High, /CAS=Low, /WE=Low, and A10=Low. In this case, writing is performed starting from column address CA selected by row/column address signals A13 to A0 in memory banks BK0 to BK7 selected by bank address signals BA0, BA1, and BA2.

[11] Combination of Signals for Write & Auto-Precharge Command WRITA

CKE of previous clock cycle time (N−1)=High, CKE of current clock cycle time (N)=High, /CS=Low, /RAS=High, /CAS=Low, /WE=Low, and A10=High. In this case, data writing is performed starting from column address CA selected by row/column address signals A13 to A0 in memory banks BK0 to BK7 selected by bank address signals BA0, BA1, and BA2 and, after the write operation is completed, precharge is automatically performed.

[12] Combination of Signals for Read Command READ

CKE of previous clock cycle time (N−1)=High, CKE of current clock cycle time (N)=High, /CS=Low, /RAS=High, /CAS=Low, /WE=High, and A10=Low. In this case, data reading is performed starting from column address CA selected by row/column address signals A13 to A0 in memory banks BK0 to BK7 selected by bank address signals BA0, BA1, and BA2.

[13] Combination of Signals for Read & Auto-Precharge Command READA

CKE of previous clock cycle time (N−1)=High, CKE of current clock cycle time (N)=High, /CS=Low, /RAS=High, /CAS=Low, /WE=High, and A10=High. In this case, data reading is performed starting from column address CA selected by row/column address signals A13 to A0 in memory banks BK0 to BK7 selected by bank address signals BA0, BA1, and BA2 and, after the read operation is completed, precharge is automatically performed.

[14] Combination of Signals for No-Operation Command NOP

CKE of previous clock cycle time (N−1)=High, /CS=Low, /RAS=High, /CAS=High, and /WE=High.

[15] Combination of Signals for Deselect Command DESL

CKE of previous clock cycle time (N−1)=High, and /CS=High.

[16] Combination of Signals for Power Down Mode/Entry Command PDEN

CKE of previous clock cycle time (N−1)=High, CKE of current clock cycle time (N)=Low, and /CS=High.

[17] Combination of Signals for Power-Down-Mode Release Command PDENX

CKE of previous clock cycle time (N−1)=Low, CKE of current clock cycle time (N)=High, and /CS=High.

<Description of IO buffer IOBUF>

Figure 7:
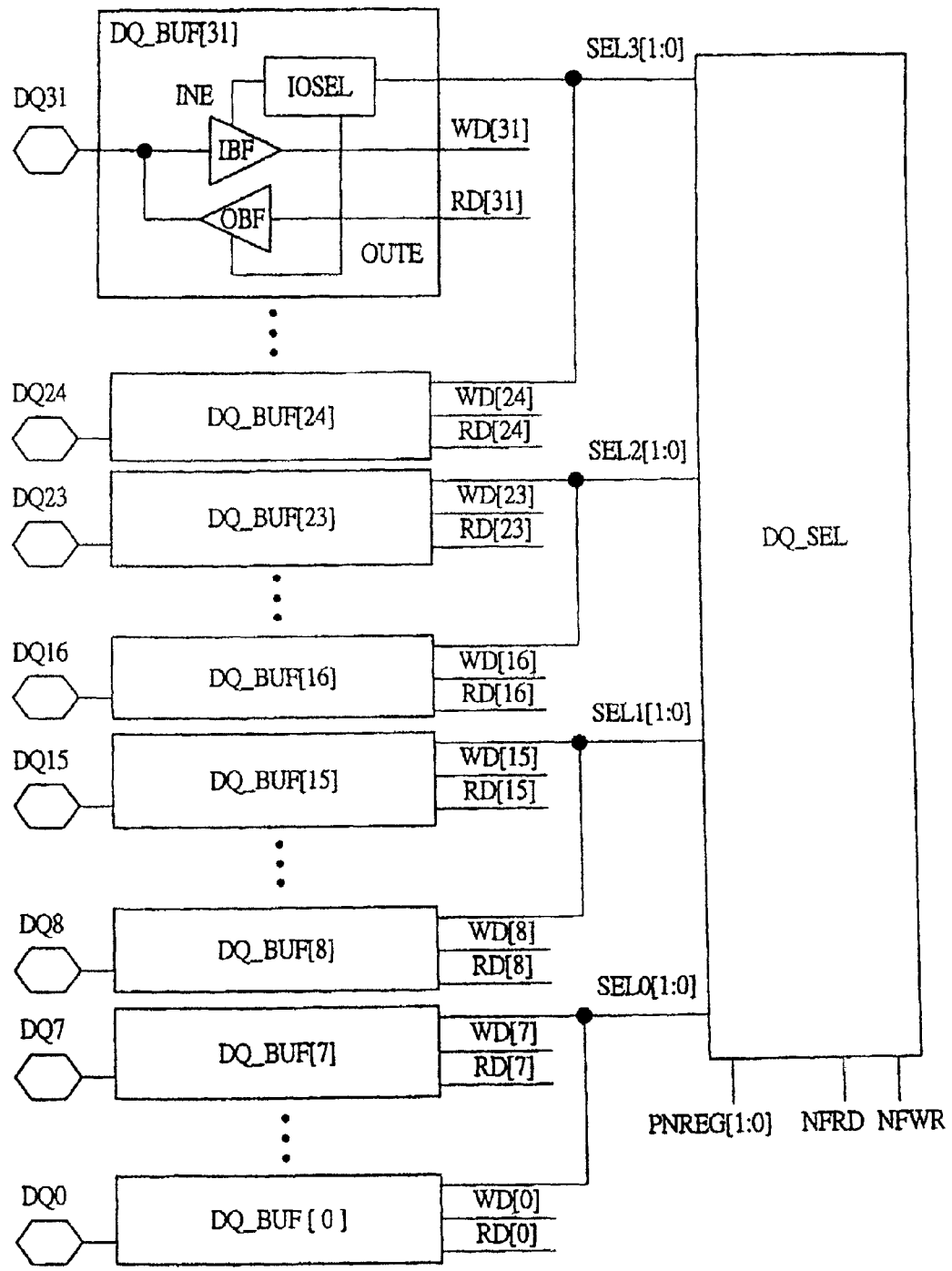
FIG. 7 is a circuit diagram to show an example of a configuration of a principal part of an IO buffer of the random access memory in the information processing system of FIG. 1.

FIG. 7 is a circuit diagram to show an example of a configuration of a principal part of IO buffer IOBUF of random access memory MEM0 in the information processing system of FIG. 1. IO buffer IOBUF shown in FIG. 7 includes data buffers DQ_BUF[0] to DQ_BUF[31] corresponding to each bit of data signals DQ[31:0], and data signal input/output selection circuit DQ_SEL. Each of DQ_BUF[0] to DQ_BUF[31] is made up of input buffer IBF, output buffer OBF, and selection circuit IOSEL.

Data signal input/output selection circuit DQ_SEL is a circuit for selecting whether 32 data buffers DQ_BUF are set as input-only buffers, output-only buffers, or input/output buffers. Corresponding to the inputted values of pin register PNREG[1:0], read instruction signal NFRD, and write instruction command NFWR, DQ_SEL output the values of SEL3[1:0], SEL2[1:0], SEL1[1:0], and SEL0[1:0]. SEL3[1:0] is inputted to selection circuits IOSEL in data buffers DQ_BUF[24] to DQ_BUF[31] corresponding to data signals DQ[31:24]. SEL2[1:0] is inputted to selection circuits IOSEL in data buffers DQ_BUF[16] to DQ_BUF[23] corresponding to data signals DQ[23:16]. SEL1[1:0] is inputted to selection circuits IOSEL in data buffers DQ_BUF[8] to DQ_BUF[15] corresponding to data signals DQ[15:8]. SEL0[1:0] is inputted to selection circuits IOSEL in data buffers DQ_BUF[0] to DQ_BUF[7] corresponding to data signals DQ[7:0].

When SEL3[1] is Low, regardless of the value of SEL3[0], each selection circuit IOSEL in DQ_BUF[24] to DQ_BUF[31] turns its own input-buffer activation signal INE and output-buffer activation signal OUTE to Low, thus disabling input buffer IBF and output buffer OBF. Consequently, data signals DQ[31:24] have a high impedance. When SEL3[1] is High and SEL3[0] is High, each selection circuit IOSEL in DQ_BUF[24] to DQ_BUF[31] turns its own INE to Low and OUTE to High, thus disabling input buffer IBF and enabling output buffer OBF. Consequently, the data inputted from data signals RD[31:24] are outputted as data signals DQ[31:24] through output buffers OBF in DQ_BUF[24] to DQ_BUF[31]. Further, when SEL3[1] is High and SEL3[0] is Low, each selection circuit IOSEL in DQ_BUF[24] to DQ_BUF[31] turns its own INE to High and OUTE to Low, thus enabling input buffer IBF and disabling output buffer OBF. Consequently, the data inputted from data signals DQ[31:24] are transmitted as data WD[31:24] through input buffers IBF in DQ_BUF[24] to DQ_BUF[31].

When SEL2[1] is Low, regardless of the value of SEL2[0], each selection circuit IOSEL in DQ_BUF[16] to DQ_BUF[23] turns its own input-buffer activation signal INE and output-buffer activation signal OUTE to Low, thus disabling input buffer IBF and output buffer OBF. Consequently, data signals DQ[23:16] have a high impedance. When SEL2[1] is High and SEL2[0] is High, each selection circuit IOSEL in DQ_BUF[16] to DQ_BUF[23] turns its own INE to Low and OUTE to High, thus disabling input buffer IBF and enabling output buffer OBF. Consequently, the data inputted from data signals RD[23:16] are outputted as data DQ[23:16] through output buffers OBF in DQ_BUF[16] to DQ_BUF[23]. Further, when SEL2[1] is High and SEL2[0] is Low, each selection circuit IOSEL in DQ_BUF[16] to DQ_BUF[23] turns its own INE to High and OUTE to Low, thus enabling input buffer IBF and disabling output buffer OBF. Consequently, the data inputted from data signals DQ[23:16] are outputted as data WD[23:16] through input buffers IBF in DQ_BUF[16] to DQ_BUF[23].

When SEL1[1] is Low, regardless of the value of SEL1[0], each selection circuit IOSEL in DQ_BUF[8] to DQ_BUF[15] turns its own input-buffer activation signal INE and output-buffer activation signal OUTE to Low, thus disabling input buffer IBF and output buffer OBF. Consequently, data signals DQ[15:8] have a high impedance. When SEL1[1] is High and SEL1[0] is High, each selection circuit IOSEL in DQ_BUF[8] to DQ_BUF[15] turns its own INE to Low and OUTE to High, thus disabling input buffer IBF and enabling output buffer OBF. Consequently, the data inputted from data signals RD[15:8] are outputted as data signals DQ[15:8] through output buffers OBF in DQ_BUF[8] to DQ_BUF[15]. Further, when SEL1[1] is High and SEL1[0] is Low, each selection circuit IOSEL in DQ_BUF[8] to DQ_BUF[15] turns its own INE to High and OUTE to Low, thus enabling input buffer IBF and disabling output buffer OBF. Consequently, the data inputted from data signals DQ[15:8] are transmitted as data WD[15:8] through input buffers IBF in DQ_BUF[8] to DQ_BUF[15].

When SEL0[1] is Low, regardless of the value of SEL0[0], each selection circuit IOSEL in DQ_BUF[0] to DQ_BUF[7] turns its own input-buffer activation signal INE and output-buffer activation signal OUTE to Low, thus disabling input buffer IBF and output buffer OBF. Consequently, data signals DQ[7:0] have a high impedance. When SEL0[1] is High and SEL0[0] is High, each selection circuit IOSEL in DQ_BUF[0] to DQ_BUF[7] turns its own INE to Low and OUTE to High, thus disabling input buffer IBF and enabling output buffer OBF. Consequently, the data inputted from data signals RD[7:0] are outputted as data signals DQ[7:0] through output buffers OBF in DQ_BUF[0] to DQ_BUF[7]. Further, when SEL0[1] is High and SEL0[0] is Low, each selection circuit IOSEL in DQ_BUF[0] to DQ_BUF[7] turns its own INE to High and OUTE to Low, thus enabling input buffer IBF and disabling output buffer OBF. Consequently, the data inputted from data signals DQ[7:0] are transmitted as data WD[7:0] through input buffers IBF in DQ_BUF[0] to DQ_BUF[7].

Now, firstly, description will be made on the case in which every data buffer DQ_BUF is operated as an input/output buffer. When the value of pin register PNREG[1] is set to Low and the value of PNREG[0] is set to Low, data signal input/output selection circuit DQ_SEL changes the values of SEL3 [1:0], SEL2[1:0], SEL1[1:0], and SEL0[1:0] corresponding to read instruction signal NFRD and write instruction signal NFWR, thereby causing data buffers DQ_BUF[0] to DQ_BUF[31] to operate as input/output buffers. Hereafter, an example of the control method is shown.

Read instruction signal NFRD and write instruction signal NFWR have been set to Low by the initialization operation when the power supply is turned on, and both are at Low in idle state (IDLE). Command decoder CMD_DEC decodes a command from command signal COM to notify it to control circuit CNT_LOG. When the command decoded by CMD_DEC is a read command, CNT_LOG turns read instruction signal NFRD to High and write instruction signal NFWR to Low, and notifies the decoded command to data signal input/output selection circuit DQ_SEL. Upon receipt of these decoded commands, DQ_SEL turns all the signals of SEL3 [1:0], SEL2[1:0], SEL1[1:0], and SEL0[1:0] to High, disabling all input buffers IBF and enabling all output buffers OBF so that all data buffers DQ_BUF[0] to DQ_BUF[31] are output buffers. As a result, data is outputted as data signals DQ[31:0] and transmitted to information processing device CPU_CHIP.

After all the data is outputted, in CNT_LOG, NFRD is turned to Low, NFWR is turned to Low, and those are notified to DQ_SEL. Upon receipt of those, DQ_SEL turns all the signals of SEL3[1:0], SEL2[1:0], SEL1[1:0], and SEL0[1:0] to Low so that all input buffers IBF and output buffers OBF are disabled. As a result, data signals DQ[31:0] have a high impedance.

When the command decoded by command decoder CMD_DEC is a write command, control circuit CNT_LOG turns read instruction signal NFRD to Low and write instruction signal NFWR to High, and notifies the decoded command to data signal input/output selection circuit DQ_SEL. Upon receipt of these decoded commends, DQ_SEL turns all the signals of SEL3[1], SEL2[1], SEL1[1], and SEL0[1] to High and turns all the signals of SEL3[0], SEL2[0], SEL1[0], and SEL0[0] to Low thereby enabling all input buffers IBF and disabling all output buffers OBF so that all data buffers DQ_BUF[0] to DQ_BIF[31] are input buffers. As a result, information processing device CPU_CHIP can write data through the signal line for data signal DQ[31:0].

After all the data is inputted to data buffers DQ_BUF[0] to DQ_BUF[31], CNT_LOG turns NFRD to Low and NFWR to High, and notifies that to DQ_SEL. Upon receipt of those, DQ_SEL turns all the signals of SEL3[1:0], SEL2[1:0], SEL1 [1:0], and SEL0[1:0] to Low such that all of input buffers IBF and output buffers OBF will be disabled. As a result, data signals DQ[31:0] have a high impedance. It is noted that when each data buffers DQ_BUF is operated as an input/output buffer, that is, when the value of pin register PNREG[1] is set to Low and the value of PNREG[0] is set to Low, CNT_LOG performs control such that NFRD and NFWR will not be at High at the same time.

Next, description will be made of the case in which data buffers DQ_BUF[16] to DQ_BUF[31] corresponding to data signals DQ[31:16] are operated as input-only buffers, and data buffers DQ_BUF[0] to DQ_BUF[15] corresponding to data signals DQ[15:0] are operated as output-only buffers. When the value of pin register PNREG[1] is set to Low and the value of PNREG[0] is set to High, data signal input/output selection circuit DQ_SEL turns SEL3[0] and SEL2[0] to Low, and SEL1[0] and SEL0[0] to High. As a result of this, the output buffers OBF of DQ_BUF[16] to DQ_BUF[31] are disabled and the input buffers IBF of DQ_BUF[0] to DQ_BUF[15] are disabled. The values of SEL3[1], SEL2[1], SEL1[1], and SEL0[1] are changed corresponding to read instruction signal NFRD and write instruction signal NFWR, and DQ_BUF[16] to DQ_BUF[31] are operated as input-only buffers, and DQ_BUF[0] to DQ_BUF[15] are operated as output-only buffers. Hereafter, an example of the control method will be shown.

Read instruction signal NFRD and write instruction signal NFWR are set to Low by the initialization operation when the power supply is turned on, and both are at Low in idle state (IDLE). Command decoder CMD_DEC decodes a command from command signal COM and notifies the decoding result to control circuit CNT_LOG. When the command decoded by CMD_DEC is a read command, CNT_LOG turns NFRD to High and notifies the decoded command to data signal input/output selection circuit DQ_SEL. Upon receipt of the decoded command, DQ_SEL turns SEL1[1] and SEL0[1] to High, enabling output buffers OBF in DQ_BUF[0] to DQ_BUF[15] such that DQ_BUF[0] to DQ_BUF[15] operate as output buffers. As a result, data is outputted as data signal DQ[15:0] and transmitted to information processing device CPU_CHIP.

After all the data is outputted, CNT_LOG turns NFRD to Low and informs that to DQ_SEL. Upon receipt of this, since NFRD is turned to Low, DQ_SEL turns SEL1[1] and SEL0 [1] to Low, disabling output buffers OBF in DQ_BUF[0] to DQ_BUF[15]. As a result, data signals DQ[15:0] have a high impedance.

When the command decoded by command decoder CMD_DEC is a write command, control circuit CNT_LOG turns read instruction signal NFRD to Low and write instruction signal NFWR to High, and notifies the decoded command to data signal input/output selection circuit DQ_SEL. Upon receipt of these decoded commands, DQ_SEL turns SEL3[1] and SEL2[1] to High, enabling input buffers IBF in DQ_BUF [16] to DQ_BUF[31] so that DQ_BUF[16] to DQ_BUF[31] operate as input buffers. As a result, information processing device CPU_CHIP can write data using data signals DQ[31: 16].

After all the data is inputted into data buffers DQ_BUF[16] to DQ_BUF[31], CNT_LOG turns NFWR to Low and notifies that to DQ_SEL. Upon receipt of that, since write instruction signal NFWR is turned to Low, DQ_SEL turns SEL3[1] and SEL2[1] to Low, disabling input buffers IBF in DQ_BUF [16] to DQ_BUF[31]. As a result, data signals DQ[31:16] have a high impedance. It is noted that when DQ_BUF[16] to DQ_BUF[31] are operated as input-only buffers and DQ_BUF[0] to DQ_BUF[15] are operated as output-only buffers, since read operations and write operations can be performed in parallel, when the value of pin register PNREG [1] is set to Low and the value of PNREG[0] is set to High, CNT_LOG performs control such that NFRD and NFWR are fully independently transitionable.

Also in the case in which data buffers DQ_BUF[24] to DQ_BUF[31] corresponding to data signals DQ[31:24] are operated as input-only buffers, and data buffers DQ_BUF[0] to DQ_BUF[23] corresponding to data signals DQ[23:0] are operated as output-only buffers, the same control as described above is performed. Further, also in the case in which data buffers DQ_BUF[8] to DQ_BUF[31] corresponding to data signals DQ[31:8] are operated as input-only buffers, and data buffers DQ_BUF[0] to DQ_BUF[7] corresponding to data signals DQ[7:0] are operated as output-only buffers, the same control as described above is performed.

Figure 8:
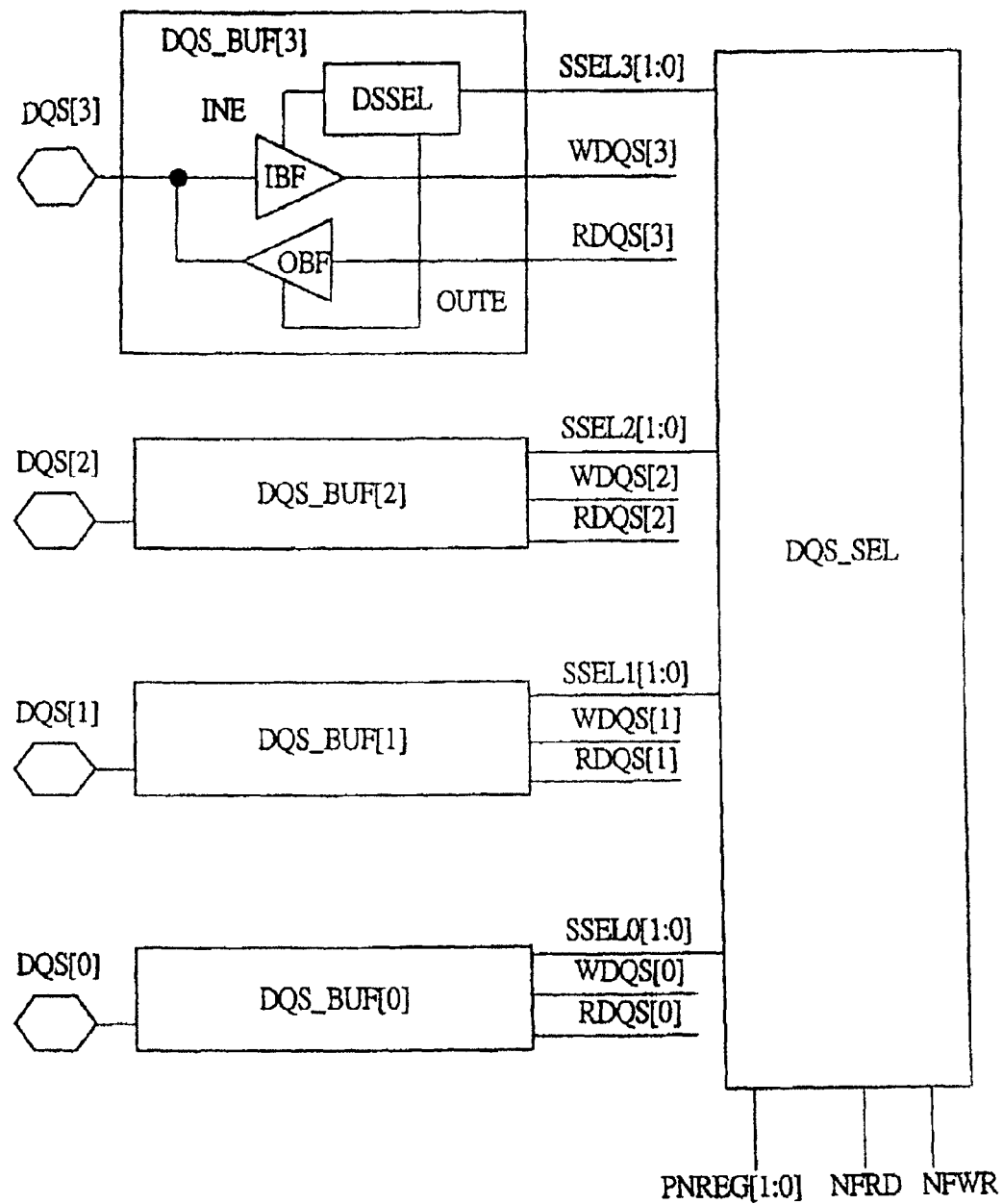
FIG. 8 is a circuit diagram to show an example of a configuration of another principal part of the IO buffer of the random access memory in the information processing system of FIG. 1.

FIG. 8 is a circuit diagram to show an example of a configuration of another principal part in IO buffer IOBUF of random access memory MEM0 in the information processing system of FIG. 1. IO buffer IOBUF shown in FIG. 8 includes data synchronization buffers DQS_BUF[0] to DQS_BUF[3] corresponding to each bit of data synchronization signals DQS[3:0], and data-synchronization signal input/output selection circuit DQS_SEL. Each of DQS_BUF[0] to DQS_BUF[3] includes input buffer IBF, output buffer OBF, and selection circuit DSSEL.

Data-synchronization signal input/output selection circuit DQS_SEL is a circuit to select whether 4 data synchronization buffers DQS_BUF[0] to DQS_BUF[3] are set to be input buffers, output buffers, or input/output buffers. DQS_SEL outputs the values of SSEL3[1:0], SSEL2[1:0], SSEL1[1:0], and SSEL0[1:0] corresponding to the inputted value of pin register PNREG[1:0], read instruction signal NFRD, and write instruction signal NFWR. SSEL3[1:0] is inputted to selection circuit DSSEL of DQS_BUF[3], SSEL2[1:0] is inputted to DSSEL of DQS_BUF[2], SSEL1[1:0] is inputted to DSSEL of DQS_BUF[1], and SSEL0[1:0] is inputted to DSSEL of DQS_BUF[0].

When SSEL3[1] is Low, regardless of the value of SSEL3[0], selection circuit DSSEL of data synchronization buffer DQS_BUF[3] corresponding to data synchronization signal DQS[3] turns input-buffer activation signal INE and output-buffer activation signal OUTE to Low, disabling input buffer IBF and output buffer OBF. Consequently, data synchronization signal DQS[3] has a high impedance. When SSEL3[1] is High and SSEL3[0] is High, DSSEL of DQS_BUF[3] turns INE to Low and OUTE to High, disabling IBF and enabling OBF. Consequently, the signal inputted from read-data synchronization signal RDQS[3] is outputted from DQS[3] through OBF in DQS_BUF[3]. When SSEL3[1] is High and SSEL3[0] is Low, DSSEL of DQS_BUF[3] turns INE to High and OUTE to Low, enabling IBF and disabling OBF. Consequently, the signal inputted from DQS[3] is transmitted as write-data synchronization signal WDQS[3] through IBF in DQS_BUF[3].

When SSEL2[1] is Low, regardless of the value of SSEL2[0], selection circuit DSSEL of data synchronization buffer DQS_BUF[2] corresponding to data synchronization signal DQS[2] turns input-buffer activation signal INE and output-buffer activation signal OUTE to Low, disabling input buffer IBF and output buffer OBF. Consequently, data synchronization signal DQS[2] has a high impedance. When SSEL2[1] is High and SSEL2[0] is High, DSSEL of DQS_BUF[2] turns INE to Low and OUTE to High, disabling IBF and enabling OBF. Consequently, the signal inputted from read-data synchronization signal RDQS[2] is outputted as DQS[2] through OBF in DQS_BUF[2]. When SSEL2[1] is High and SSEL2[0] is Low, DSSEL of DQS_BUF[2] turns INE to High and OUTE to Low, enabling IBF and disabling OBF. Consequently, the signal inputted from DQS[2] is transmitted as write-data synchronization signal WDQS[2] through IBF in DQS_BUF[2].

When SSEL1[1] is Low, regardless of the value of SSEL1[0], selection circuit DSSEL of data synchronization buffer DQS_BUF[1] corresponding to data synchronization signal DQS[1] turns input-buffer activation signal INE and output-buffer activation signal OUTE to Low, disabling input buffer IBF and output buffer OBF. Consequently, data synchronization signal DQS[1] has a high impedance. When SSEL1[1] is High and SSEL1[0] is High, DSSEL of DQS_BUF[1] turns INE to Low and OUTE to High, disabling IBF and enabling OBF. Consequently, the signal inputted from read-data synchronization signal RDQS[1] is outputted as DQS[1] through OBF in DQS_BUF[1]. When SSEL1[1] is High and SSEL1[0] is Low, DSSEL of DQS_BUF[1] turns INE to High and OUTE to Low, enabling IBF and disabling OBF. Consequently, the signal inputted from DQS[1] is transmitted as write-data synchronization signal WDQS[1] through IBF in DQS_BUF[1].

When SSEL0[1] is Low, regardless of the value of SSEL0[0], selection circuit DSSEL of data synchronization buffer DQS_BUF[0] corresponding to data synchronization signal DQS[0] turns input-buffer activation signal INE and output-buffer activation signal OUTE to Low, disabling input buffer IBF and output buffer OBF. Consequently, data synchronization signal DQS[0] has a high impedance. When SSEL0[1] is High and SSEL0[0] is High, DSSEL of DQS_BUF[0] turns INE to Low and OUTE to High, disabling IBF and enabling OBF. Consequently, the signal inputted from read-data synchronization signal RDQS[0] is outputted as DQS[0] through OBF in DQS_BUF[0]. When SSEL0[1] is High and SSEL0[0] is Low, DSSEL of DQS_BUF[0] turns INE to High and OUTE to Low, enabling IBF and disabling OBF. Consequently, the signal inputted from DQS[0] is transmitted as write-data synchronization signal WDQS[0] through IBF in DQS_BUF[0].

Now, first, description will be made of the case in which all data synchronization buffers DQS_BUF are operated as input/output buffers. When the value of pin register PNREG[1] is set to Low and the value of PNREG[0] is set to Low, data-synchronization signal input/output selection circuit DQS_SEL changes the values of SSEL3[1:0], SSEL2[1:0], SSEL1[1:0], and SSEL0[1:0] corresponding to read instruction signal NFRD and write instruction signal NFWR to cause data synchronization buffers DQS_BUF[0] to DQS_BUF[3] to operate as input/output buffers. Hereafter, an example of the control method will be shown.

Read instruction signal NFRD and write instruction signal NFWR are set to Low by the initialization operation when the power supply is turned on, and both are at Low in idle state (IDLE). Command decoder CMD_DEC decodes a command from command signal COM and notifies the decoded command to control circuit CNT_LOG. When the command decoded by CMD_DEC is a read command, CNT_LOG turns NFRD to High and NFWR to Low and notifies the decoded command to DQS_SEL. Upon receipt of that, DQS_SEL turns all the signals of SSEL3[1:0], SSEL2[1:0], SSEL1[1:0], and SSEL0[1:0] to High, disabling all input buffers IBF and enabling all output buffers OBF such that DQS_BUF[0] to DQS_BUF[3] are output buffers. As a result, read-data synchronization signals RDQS[3:0] are outputted as data synchronization signals DQS[3:0] via output buffer OBF and transmitted to information processing device CPU_CHIP.

After all read data is outputted from data signals DQ[31:0], CNT_LOG turns NFRD to Low and NFWR to Low, and notifies that to DQS_SEL. Upon receipt of those, DQS_SEL turns all the signals of SSEL3[1:0], SSEL2[1:0], SSEL1[1:0], and SSEL0[1:0] to Low so that all IBF and OBF are disabled. As a result, data synchronization signals DQS[3:0] have a high impedance.

On the other hand, when the command decoded by command decoder CMD_DEC is a write command, control circuit CNT_LOG turns read instruction signal NFRD to Low and write instruction signal NFWR to High, and notifies the decoded command to data-synchronization signal input/output selection circuit DQS_SEL. DQS_SEL turns the signals of SSEL3[1], SSEL2[1], SSEL1[1], and SSEL0[1] to High, and all the signals of SSEL3[0], SSEL2[0], SSEL1[0], and SSEL0[0] to Low, enabling all input buffers IBF and disabling all output buffers OBF such that all data synchronization buffers DQS_BUF[0] to DQS_BUF[3] are input buffers. As a result, information processing device CPU_CHIP can convey signals from data synchronization signal DQS[3:0] as write-data synchronization signal WDQS[3:0] via input buffer IBF.

After all the write data is inputted from data signal DQ[31: 0], CNT_LOG turns NFRD to Low and NFWR to High, and notifies that to DQS_SEL. Upon receipt of that, DQS_SEL turns all the signals of SSEL3[1:0], SSEL2[1:0], SSEL1[1:0], and SSEL0[1:0] to Low in order to disable all IBF and OBF. As a result, data synchronization signal DQs[3:0] has a high impedance. It is noted that in order to cause all data synchronization buffers DQS_BUF to operate as input/output buffers, when the value of pin register PNREG[1] is set to Low, and when the value of PNREG[0] is set to Low, control circuit CNT_LOG performs control such that read instruction signal NFRD and write instruction signal NFWR will not be at High at the same time.

Next, description will be made of the case in which data synchronization buffers DQS_BUF corresponding to data synchronization signals DQS[3:2] are operated as input-only buffers, and data synchronization buffers DQS_BUF corresponding to data synchronization signals DQS[1:0] are operated as output-only buffers. When the value of pin register PNREG[1] is set to Low and the value of PNREG[0] is set to High, data-synchronization signal input/output selection circuit DQS_SEL turns SSEL3[0] and SSEL2[0] to Low and SSEL1[0] and SSEL0[0] to High. As a result, output buffers OBF of data synchronization buffers DQS_BUF[2] and DQS_BUF[3] corresponding to data synchronization signals DQS[3:2] are disabled and input buffers IBF of data synchronization buffers DQS_BUF[0] and DQS_BUF[1] corresponding to data synchronization signals DQS[1:0] are disabled. Corresponding to read instruction signal NFRD and write instruction signal NFWR, the values of SSEL3[1], SSEL2[1], SSEL1[1], and SSEL0[1] are changed so that DQS_BUF[2] and DQS_BUF[3] are operated as input-only buffers, and DQS_BUF[0] and DQS_BUF[1] are operated as output-only buffers. Hereafter, an example of the control method will be shown.

Read instruction signal NFRD and write instruction signal NFWR are set to Low by the initialization operation when the power supply is turned on, and remain at Low in idle state (IDLE). Command decoder CMD_DEC decodes a command from command signal COM and notifies the decoded command to control circuit CNT_LOG. When the command decoded by CMD_DEC is a read command, CNT_LOG turns NFRD to High and notifies the decoded command to DQS_SEL. Upon receipt of the decoded command, DQS_SEL turns SSEL1[1] and SSEL0[1] to High, enabling output buffers OBF in DQS_BUF[0] and DQS_BUF[1] such that DQS_BUF[0] and DQS_BUF[1] operate as output buffers. As a result, read-data synchronization signals RDQS[1:0] are outputted as data synchronization signals DQS[1:0] via output buffer OBF and are transmitted to information processing device CPU_CHIP.

After all the read data is outputted from data signals DQ[31:0], CNT_LOG turns NFRD to Low and notifies that to DQS_SEL. Upon receipt of that, since NFRD is turned to Low, DQS_SEL turns SSEL1[1] and SSEL0[1] to Low, disabling output buffers OBF in DQS_BUF[0] and DQS_BUF [1]. As a result, data synchronization signals DQS[1:0] have a high impedance.

On the other hand, when the command decoded by command decoder CMD_DEC is a write command, control circuit CNT_LOG turns read instruction signal NFRD to Low and write instruction signal NFWR to High, and notifies the decoded command to data-synchronization signal input/output selection circuit DQS_SEL. Upon receipt of the decoded command, DQS_SEL turns SSEL3[1] and SSEL2[1] to High enabling input buffers IBF in DQS_BUF[2] and DQS_BUF [3] such that data synchronization buffers DQS_BUF[2] and DQS_BUF[3] corresponding to data synchronization signal DQS[3:2] operate as input buffers. As a result, information processing device. CPU_CHIP can convey the signal from data synchronization signal DQS[3:2] as write-data synchronization signal WDQS[3:2] via input buffer IBF.

After all the write data is inputted from data signal DQ[31: 0], CNT_LOG turns NFWR to Low and notifies that to DQS_SEL. Upon receipt of that, since NFWR is turned to Low, DQS_SEL turns SSEL3[1] and SSEL2[1] to Low disabling input buffers IBF in DQS_BUF[2] and DQS_BUF[3]. As a result of this, data synchronization signals DQS[3:2] have a high impedance. It is noted that when DQS_BUF[2] and DQS_BUF[3] are operated as input-only buffers, and DQS_BUF[0] and DQS_BUF[1] are operated as output-only buffers, since a read operation and a write operation can be performed in parallel, when the value of pin register PNREG[1] is set to Low, and when the value of PNREG[0] is set to High, CNT_LOG performs control such that NFRD and NFWR are fully independently transitionable.

Further, similar control as described above will also be performed in the case in which data synchronization buffer DQS_BUF[3] corresponding to data synchronization signals DQS[3] is operated as input-only buffers, and data synchronization buffers DQS_BUF[0] to DQS_BUF[2] corresponding to data synchronization signals DQS[2:0] are operated as output-only buffers. Further, similar control as described above will be performed in the case in which data synchronization buffers DQS_BUF[1] to DQS_BUF[3] corresponding to data synchronization signals DQS[3:1] are operated as input-only buffers, and data synchronization buffer DQS_BUF[0] corresponding to data synchronization signal DQS [0] is operated as an output-only buffer.

<Description of State Transition Diagram>

Figure 9:
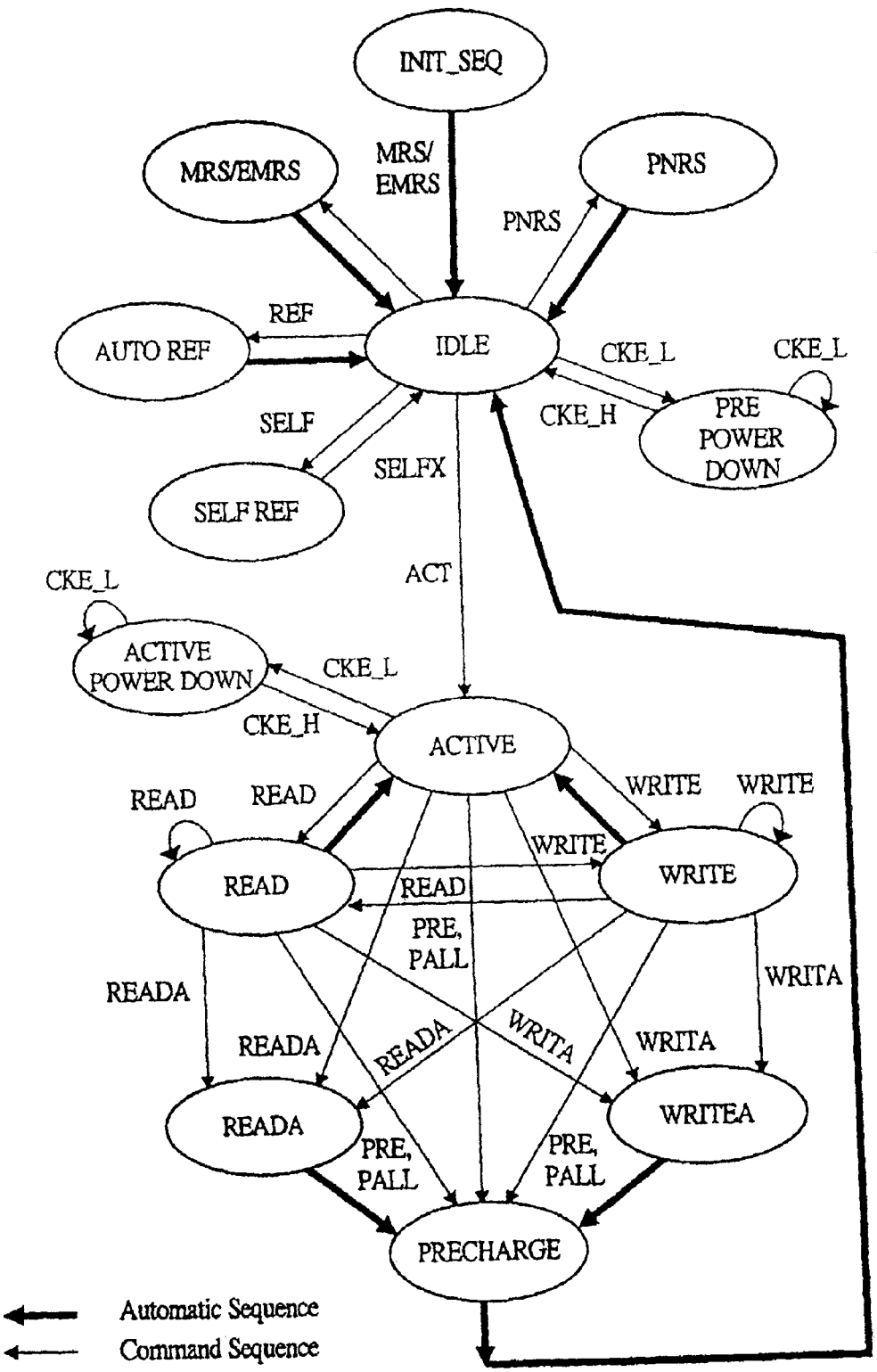
FIG. 9 shows an example of the state transition diagram of the random access memory in the information processing system of FIG. 1.

FIG. 9 shows an example of the state transition diagram of random access memory MEM0 in the information processing system of FIG. 1. When the power supply to random access memory MEM0 is turned on, initialization operation (INIT_SEQ) shown in FIG. 2 is performed on MEM0 by information processing device CPU_CHIP, and MEM0 is brought into idle state (IDLE) to wait for a request from the outside. In idle state (IDLE), MEM0 can accept as a request, though not specifically limited to, mode-register set command MRS, extended-register set command EMRS, pin-register set command PNRS, self refresh command SELF, and auto refresh command REF.

In idle state (IDLE), upon input of pin-register set command PNRS, the values of row/column address signals A13 to A0 are set in pin register PNREG as operation code PINOPCODE. After the values are set in pin register PNREG, MEM0 moves into idle state (IDLE) again. On this occasion, as described in FIG. 6, depending on the value set in pin register PNREG, there may be a case in which a part of data signals DQ is set as an input-only signal and a remaining part is set as an output-only signal, or a case in which all of data signals DQ are set as input/output signals.

In idle state (IDLE), upon input of mode-register set command MRS, the values of row/column address signals A13 to A0 are set as operation code MRSOPCODE in mode register MREG. After the values are set in mode register MREG, MEM0 moves into idle state (IDLE) again. On this occasion, as described FIG. 6, depending on the value set in mode register MREG, though not specifically limited to, a burst length, a read latency, and the like are set up.

In idle state (IDLE), upon input of extended-register set command EMRS, the values of row/column address signals A13 to A0 are set as operation code EMRSOPCODE in extended register EREG. After the values are set in extended register EREG, MEM0 moves into the idle state (IDLE) again. In this occasion, as described in FIG. 6, by means of the values set in extended register EREG, though not specifically limited to, a guaranteed temperature range of self refresh and the like are set up.

In idle state (IDLE), upon input of self-refresh/entry command SELF, MEM0 moves into a self refresh state, and refresh control circuit REFC within MEM0 automatically performs refresh operation on memory banks BK0 to BK7 using an internal refresh counter. Further, temperature information of temperature sensor THMO within MEM0 is inputted to REFC and, with this temperature information, REFC automatically adjusts the frequency of refresh operations. In this self refresh state, when self-refresh release command SELFX is inputted, MEM0 moves into an idle state.

In idle state (IDLE), upon input of refresh command REF, refresh control circuit REFC within MEM0 starts operating to perform a refresh operation (AUTOREF) on memory banks BK0 to BK7. After the refresh operation is completed, MEM0 moves into idle state (IDLE) again.

In idle state (IDLE), when signal CKE turns to LOW (CKE_L), MEM0 moves into a precharge power-down mode making it possible to reduce the standby current during idle state (IDLE). When signal CKE turns to High (CKE_H), MEM0 returns to idle state (IDLE).

In idle state (IDLE), upon input of bank active command ACT, memory banks selected by bank address signals BA0, BA1, and BA2 are activated, causing MEM0 to move into active state (ACTIVE).

In active state (ACTIVE), upon input of read command READ, data is read out from activated memory banks. After the data is read out, MEM0 moves into active state (ACTIVE) again.

In active state (ACTIVE), upon input of read & precharge command READA, data is read out from activated memory banks. After the data is read out, the activated memory banks are deactivated by precharge operation and MEM0 moves into idle state (IDEL).

In active state (ACTIVE), upon input of write command WRIT, data is written into activated memory banks. After the data is written into the memory banks, MEM0 moves into active state (ACTIVE) again.

In active state (ACTIVE), upon input of write & precharge command WRITA, data is written into activated memory banks. After the data is written into the memory banks, the activated memory banks are deactivated by a precharge operation and MEM0 moves into the idle state (IDLE).

In active state (ACTIVE), upon input of precharge command PRE, the memory banks selected by bank address signals BA0, BA1, and BA2 are deactivated and MEM0 moves into idle state (IDLE).

In active state (ACTIVE), upon input of precharge all command PALL, all the memory banks are deactivated and MEM0 moves into idle state (IDLE).

In active state (ACTIVE), when signal CKE turns to LOW (CKE_L), MEM0 moves into an active power-down mode, making it possible to reduce current consumption during active state (ACTIVE). When signal CKE turns to High (CKE_H), MEM0 returns to idle state (IDLE).

As so far described, when a read operation and a write operation from and to random access memory MEM0 take place alternately, by setting data signal DQ[31:16] to be an input-only data signal in pin register PNREG, by setting data signal DQ[15:0] to be an output-only data signal, by setting data synchronization signal DQS[3:2] to be an input-only signal, and by setting data synchronization signal DQS[1:0] to be an output-only signal, separating data read signals from data write signals and performing a data read operation and a data write operation independently are made possible. As a result, no time is needed for switching between read data and write data thus making it possible to realize a high-speed data transfer.

Further, when read operations from random access memory MEM0 successively take place, since setting data signals DQ[31:0] to data input/output signals at pin register PINREG, and setting data synchronization signal DQS[3:0] to be an input/output signal will result in a data amount, which can be read at one time, becomes 32 bits, it is possible to read data at a high speed. Moreover, similarly, when write operations to random access memory MEM0 successively take place, since the data amount, which can be written at one time, also becomes 32 bits, it is possible, needless to say, to write data at a high speed.

Therefore, since by taking advantage of characteristic features of memory access to random access memory MEM0, which originate from the program executed by itself, information processing device CPU_CHIP can divide the data signals of random access memory MEM0 into input-only data signals and output-only data signals, or switch them into input/output data signals, therefore while executing the program, it is possible to realize a high-speed data transfer in accordance with the program. Associated with this, it is possible to realize an information processing system having high speed and ease of use.

Exemplary Embodiment 2

Figure 10:
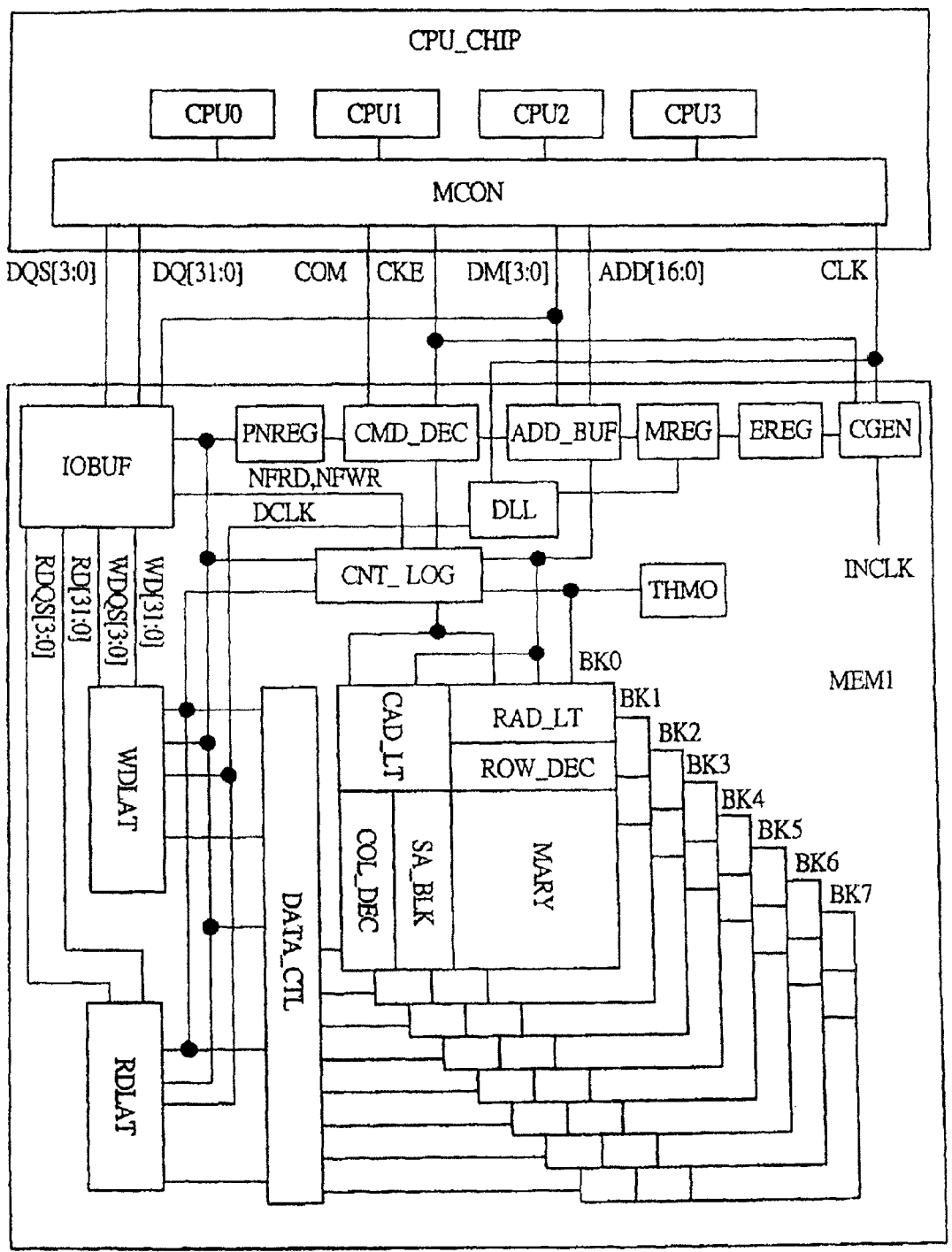
FIG. 10 is a block diagram to show an example of the configuration of the information processing system according to exemplary embodiment 2.

FIG. 10 is a block diagram to show an example of the configuration of the information processing system according to a second exemplary embodiment of the present invention. The information processing system shown in FIG. 10 includes information processing device CPU_CHIP and random access memory MEM1 and is characterized in that MEM1, unlike the first exemplary embodiment, includes a nonvolatile memory cell.

Information processing device CPU_CHIP includes CPU0, CPU1, CPU2, CPU3, and memory control circuit MCON. CPU_CHIP is connected to MEM1 via MCON and performs data communication. CPU_CHIP and MEM1 are interconnected by a clock signal line for clock signal CLK, a clock-enable signal line for clock enable signal CKE, an address signal line for address signal ADD[16:0], a command signal line for command signal COM, a data mask signal line for data mask signal DM[3:0], a data signal line for data signal DQ[31:0], and data-synchronization signal line for data synchronization signal DQS[3:0].

MEM1 is made up of clock generation circuit CGEN, mode register MREG, extended mode register EREG, address buffer ADD_BUF, command decoder CMD_DEC, pin register PNREG, IO buffer IOBUF, temperature sensor THMO, control circuit CNT_LOG, write data buffer WDLAT, read data buffer RDLAT, data control circuit DATA_CTL, clock synchronization circuit DLL, and non-volatile memory banks BK0 to BK7. CGEN generates internal clock signal INCLK from CLK inputted into MEM0. This INCLK is utilized by each block making up MEM0.

Each memory bank BK0 to BK7 includes row-address latch circuit RAD_LT, column-address latch circuit CAD_LT, row decoder ROW_DEC, column decoder COL_DEC, sense amplifier block SA_BLK, and memory array NVMARY including nonvolatile memory cells. Although nonvolatile memory cells include a phase-change memory cell, a magnetic recording memory cell, a resistance variable memory cell, a mirror bit type memory cell, a floating memory cell, and the like, any type of nonvolatile memory cells can be utilized.

Since nonvolatile memory is utilized as NVMARY, there is no need for a refresh operation. For this reason, unlike the case of FIG. 1, MEM1 is not equipped with a refresh control circuit, and circuits other than this one are the same as those of random access memory MEM0 in FIG. 1. Therefore, random access memory MEM1 operates in a similar manner as in the first exemplary embodiment and has, needless to say, similar effects. Further, since MEM1 does not need a refresh operation, it can operate at low power, and since a nonvolatile memory cell is utilized for NVMARY, it can store data even when the power supply is disconnected, thus maintaining high reliability.

Exemplary Embodiment 3

Figure 11:
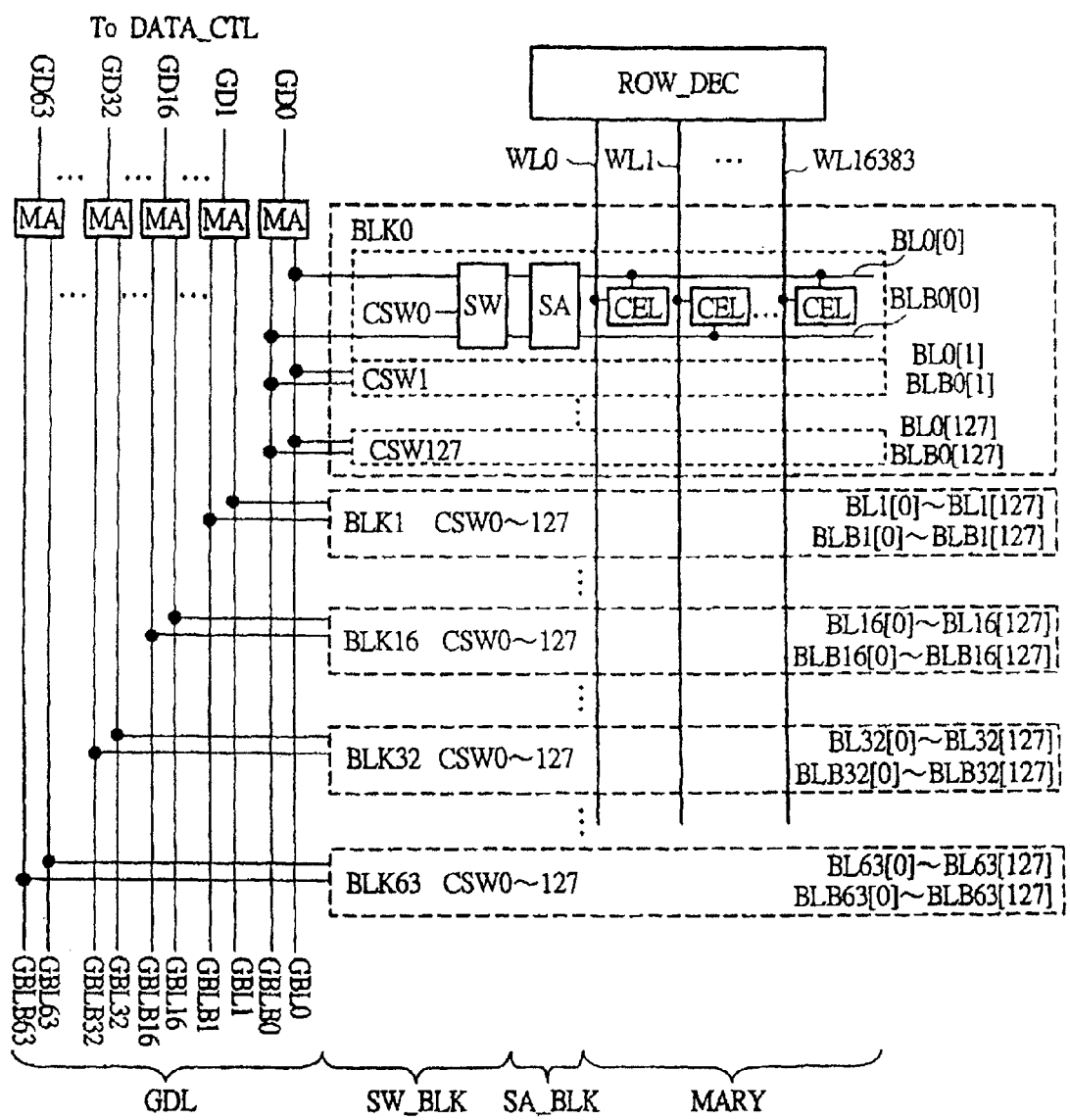
FIG. 11 is a circuit diagram to show an example of a configuration of one memory bank in the random access memory of FIG. 1 in the information processing system according to exemplary embodiment 3.

In a third exemplary embodiment of the present invention, description will be made on a more detailed example of a configuration of each of random access memories MEM0 and MEM1 which have been described in the first and second exemplary embodiments. Here, although description will be made by taking MEM0 of FIG. 1, for example, the description is applicable to the case of MEM1 as well. FIG. 11 is a circuit diagram to show an example of a configuration of one memory bank in random access memory MEM0 of FIG. 1 in the information processing system according to a third exemplary embodiment.

In FIG. 11, CEL is a memory cell, and BLK is a memory cell block. One memory cell block BLK includes, though is not specifically limited to, column switch circuit SW, sense amplifier circuit SA, and 16383 memory cells CEL. Moreover, one memory bank includes, though is not specifically limited to, 64 memory cell blocks BLK[0] to BLK[63]. A group of multiple memory cells in a memory bank is memory array MARY, and a group of multiple sense amplifier circuits SA in a memory bank is sense amplifier block SA_BLK. Moreover, a group of multiple column switch circuits SW in a memory bank is column switch block SW_BLK.

In FIG. 11, BL0[127:0] to BL63[127:0] and BLB0[127:0] to BLB63[127:0] are local bit signals, and GBL0 to GBL63 and GBLB0 to GBLB63 are global bit signals. Moreover, MA is a main amplifier circuit and GD0 to GD63 are global data signals. Global lines GDL show the regions of global bit signals, global data signals, and main amplifier circuits.

WL0 to WL16383 are word signals and there are, though not specifically limited to, 16384 lines of word signals in one memory bank. One of WL0 to WL16383 is selected according to the row address inputted into row decoder ROW_DEC. CSW0 to CSW63 are column selection signals. Although not specifically limited, when this signal turns to High, corresponding column switch circuit SW is selected, and through this selected column switch circuit SW, it is possible to read and write data from and into memory cell CEL.

Here, description will be made on an example of an operation when a read request toward random access memory MEM0 takes place while data signal DQ[31:0] is set to be an input/output signal and data synchronization signal DQS[3:0] is set to be an input/output signal in pin register PNREG.

Information processing device CPU_CHIP outputs, toward random access memory MEM0, bank active command ACT (ACT0) to command decoder CMD_DEC via the signal line for command signal COM in synchronization with clock signal CLK, and outputs, for example, bank address (BK0) and row address ROW0 to address buffer ADD_BUF through the signal line for address signal ADD. CMD_DEC decodes bank active command ACT0 and instructs control circuit CNT_LOG to activate a memory bank. According to the instruction of memory bank activation inputted to CNT_LOG and bank address (BK0), memory bank 0 (BK0) is selected. Row address ROW0 is transferred to row-address latch circuit RAD_LT of selected BK0 through address buffer ADD_BUF, and word signal WL0 corresponding to row address ROW0 is turned to High by row decoder ROW_DEC so that one page of (though not specifically limited to, 8192 bits of) retention data of memory cell CEL connected to that word signal is transferred to each sense amplifier circuit SA and is retained therein.

Next, information processing device CPU_CHIP outputs, toward MEM0, read command READ (READ0) to CMD_DEC via the signal line for COM in synchronization with CLK, and outputs, for example, bank address (BK0) and column address COL0 to ADD_BUF through the signal line for ADD. CMD_DEC decodes read command READ0 and instructs control circuit CNT_LOG to read data from memory banks. According to the instructions to read data inputted to CNT_LOG and bank address (BK0), BK0 is selected. Column address COL0 is transferred to column-address latch circuit CAD_LT of selected BK0 through ADD_BUF, and each column selection signal CSW0 in memory cell blocks BLK0 to BLK63 is turned to High by column decoder COL_DEC. As a result, the data retained by sense amplifier circuit SA is outputted to global bit signals GBL0 to GBL63 (GBLB0 to GBLB63) through selected 64 column switch circuits SW.

The 64 bits of data outputted to global bit signals are outputted to global data signals GD0 to GD63 through each main amplifier MA, and are transferred to read data buffer RDLAT through data control circuit DATA_CTL. The 64 bits of data in RDLAT are transferred in two installments to IO buffers IOBUF using read data signals RD[31:0] in synchronization with a rising edge and a falling edge of read-data synchronization signal RDQS[3:0], and are similarly outputted in two installments to information processing device CPU_CHIP using data signals DQ[31:0] in synchronization with a rising edge and a falling edge of data synchronization signal DQS[3:0]. It is noted that when write command WRIT (WRIT0) is inputted to MEM0 from CPU_CHIP as well, data writing to a memory cell will be performed in a similar fashion.

Next, description will be made of the operation when a read request toward random access memory MEM0 takes place while, in pin register PNREG, data signal DQ[31:16] is set to be an input-only signal, data signal DQ[15:0] to be an output-only signal, data synchronization signal DQS[3:2] to be an input-only signal, and data synchronization signal DQS[1:0] to be an output-only signal.

Information processing device CPU_CHIP outputs, toward random access memory MEM0, bank active command ACT (ACT0) to command decoder CMD_DEC via the signal line for command signal COM in synchronization with clock signal CLK and outputs, for example, bank address (BK0) and row address ROW0 to address buffer ADD_BUF through the signal line for address signal ADD. CMD_DEC decodes bank active command ACT0 and instructs control circuit CNT_LOG to activate a memory bank. According to the instruction of memory bank activation inputted to CNT_LOG and bank address (BK0), memory bank 0 (BK0) is selected. Row address ROW64 is transferred to row-address latch circuit RAD_LT of selected BK0 through ADD_BUF, and word signal WL0 corresponding to row address ROW0 is turned to High by row decoder ROW_DEC and the amount of one page of (though not specifically limited, 8192 bits on retention data of memory cell CEL connected to that word signal is transferred to each sense amplifier circuit SA and is retained.

Next, CPU_CHIP outputs, toward MEM0, read command READ (READ0) to CMD_DEC via the signal line for COM in synchronization with CLK and outputs, for example, bank address (BK0) and column address COL0 to ADD_BUF through the signal line for ADD. CMD_DEC decodes read command READ0, and instructs CNT_LOG to read data from a memory bank. According to the instructions to read data inputted to CNT_LOG and bank address (BK0), memory bank 0 (BK0) is selected. Column address COL0 is transferred to column-address latch circuit CAD_LT of selected BK0 through ADD_BUF, and a total of 32 column selection signals CSW0 of memory cell blocks BLK0 to BLK31 is turned to High by column decoder COL_DEC. As a result, the retention data of sense amplifier circuits SA is outputted to global bit signals GBL0 to GBL31 (GBLB0 to GBLB31) through selected 32 column switch circuits SW.

The 32 bits of data outputted to the global bit signals are outputted to global data signals GD0 to GD31 through each main amplifier MA, and are transferred to read data buffer RDLAT through data control circuit DATA_CTL. The 32 bits of data in RDLAT are transferred in two installments to IO buffer IOBUF using read data signals RD[15:0] in synchronization with a rising edge and a falling edge of read-data synchronization signal RDQS[1:0], and are similarly outputted in two installments to information processing device CPU_CHIP using data signals DQ[15:0] in synchronization with a rising edge and a falling edge of data synchronization signals DQS[1:0]. It is noted that also in the case in which write command WRIT (WRIT0) is inputted to MEM0 from CPU_CHIP, writing data to a memory cell will be performed in a similar fashion.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims The information processing system and semiconductor storage device according to the present exemplary embodiment are a beneficial technology in applying to especially a semiconductor product in which an information processing device such as a CPU etc. and a semiconductor storage device such as DDR-SDRAM etc. are installed on the same semiconductor chip or in the same semiconductor package, and without being limited thereto, is applicable to a wide area including a product in which an information processing device and a semiconductor storage device are installed on a printed board and a unitary semiconductor storage device.

It is apparent that the present invention is not limited to the above embodiments, but may be modified and changed without departing from the scope and spirit of the invention.

What is claimed is:

1. A system, comprising:
a memory including a data signal line and a data synchronization signal line; and
an information processing device which performs a data communication to and from the memory via the data signal line,
wherein the memory includes a setting module configured to store mode information, wherein the mode information determines whether the data signal line is set to be a data signal line for common input/output use in a first mode, a data signal line for output-only use in a second mode, or a data signal line for input-only use in a third mode, and wherein the mode information further determines whether the data synchronization signal line is set to be a data synchronization signal line for common input/output use in the first mode, a data synchronization signal line for output only use in the second mode, or a data synchronization signal line for input only use in the third mode;
wherein the information processing device provides a data signal line set command the mode information, wherein the data signal line set command instructs the memory to load the mode information into the setting module for specifying one of the first mode, the second mode, and the third mode corresponding to a type of the data communication before performing the data communication; and
wherein the memory sets the data signal line and the data synchronization signal line into the one of the first mode, the second mode, and the third mode based at least in part on the mode information stored in the setting module, and performs the data communication based on the set of commands by using the data signal line set in the one of the first mode, the second mode, and the third mode.

2. The system as claimed in claim 1,
wherein the memory includes a first data line, and a second data line;
the memory further comprising;
an input buffer coupled between the data signal line and the first data line;
an output buffer coupled between the data signal line and the second data line; and
wherein the setting module controls enabling/disenabling the input buffer and the output buffer based at least in part on the mode information.

3. The system as claimed in claim 1, the memory further comprising: a plurality of data buffers each including an input buffer and an output buffer to perform the data communication,
wherein the input buffers of the plurality of data buffers are activated and the output buffers of the plurality of data buffers are activated when the first mode is set so that a continuous read or write operation is performed by using the activated output buffers or input buffers, respectively.

4. The system as claimed in claim 3,
wherein the plurality of data buffers includes a first group of data buffers and a second group of data buffers, and
wherein the input buffers of the first group of data buffers are activated and the output buffers of the first group of data buffers are inactivated, and the input buffers of the second group of data buffers are inactivated and the output buffers of the second group of data buffers are activated, when the second mode is set and when the third mode is set, so that a real operation is performed by using the output buffers of the second group and a write operation is performed by using the input buffers of the first group, independently.

5. The system as claimed in claim 1,
wherein the memory further includes a read synchronization line, and a write synchronization line;
the memory further comprising:
an input buffer coupled between the data synchronization signal line and the read synchronization line:
an output buffer coupled between the data synchronization signal line and the third write synchronization line; and
wherein the setting module controls enabling/disenabling the input buffer and the output buffer based at least in part on the synchronization mode information.

6. A system, comprising:
a memory including a data signal line and a data-synchronization signal line; and
an information processing device which performs a data communication to and from the memory via the data signal line,
wherein said memory includes:
a register which retains a setting information that determines whether the data signal line is set to be a data signal line for common input/output use in a first mode, a data signal line for output-only use in a second mode, or a data signal line for input only use in a third mode, and wherein the setting information also determines whether data-synchronization signal line is set to be a data-synchronization signal line for common input/output use in the first mode, a data-synchronization signal line for output only use in the second mode, or a data-synchronization signal line for input only use in the third mode, and
a setting module which sets the data signal line and the data-synchronization signal line into the one of the first mode, the second mode, and the third mode according to the setting information retained in the register,
wherein the information processing device issues a set of commands for performing the data communication, a data signal line set command, and the setting information, wherein the data signal line set command causes the memory to store the setting information in the register; and
wherein the memory sets the data signal line and the data-synchronization signal in into the one of the first mode, the second mode, and the third mode based at least in part on the setting information in the register, and performs the data communication based on the set of commands by using the data signal line set in the one of the first mode, the second mode, and the third mode.

7. The system as claimed in claim 6, the memory further comprising:
a command decoder configured to receive the data-signal-line set command to output an instruction;
an address buffer configured to receive bits of an address signal; and
a controller configured to set the bits of the address signal as the setting information in the register responsive to the instruction.

8. The system as claimed in claim 7,
wherein the memory includes a first data line, and a second data line;
the memory further comprising:
an input buffer coupled between the data signal line and the first data line;
an output buffer coupled between the data signal line and the second data line; and wherein the setting module controls enabling/disenabling the input buffer and the output buffer, based on the bits of the register.

9. The system as claimed in claim 7, the memory further comprising:
a plurality of data buffers each including an input buffer and an output buffer to perform the data communication,
wherein the input buffers of the plurality of data buffers are activated and the output buffers of the plurality of data buffers are activated, based on the bits of address signal, when the first mode is set, so that a continuous read or write operation is performed by using the output buffers or the input buffers, respectively.

10. The system as claimed in claim 9,
wherein the plurality of data buffers includes a first group of data buffers and a second group of data buffers, and
wherein, the input buffers of the first group of data buffers are activated and the output buffers of the first group of data buffers are inactivated, and the input buffers of the second group of data buffers are inactivated and the output buffers of the second group of data buffers are activated, based on the bits of address signal, when the second mode is set and when the third modes is set, so that a read operation is performed by using the output buffers of the second group and a write operation is performed by using the input buffers of the first group, independently.

11. The system as claimed in claim 6, wherein the memory is a Double Data Rate-Synchronous Dynamic Random Access Memory.

12. The system as claimed in claim 6,
wherein the memory further includes a read synchronization line, and a write synchronization line,
the memory further comprising;
an input buffer coupled between the data-synchronization signal line and the read synchronization line;
an output buffer coupled between the data-synchronization signal line and the write synchronization line; and
wherein the setting module controls enabling/disenabling the input buffer and the output buffer based on the setting information of the register.

13. A method of transmitting a data on a plurality of data signal lines in a semiconductor storage device, the method comprising;
transmitting a first data as the data in response to continuously receiving read instructions;
transmitting a second data as the data in response to continuously receiving write instructions;
transmitting third and fourth data as the data in response to alternatively receiving read and write instructions;
before transmitting the first data, setting each of the plurality of data signal lines to be a data signal line for common input/output use and setting a data synchronization line to be a data synchronization signal line for common input/output use, so that the first data is read out from the semiconductor storage device by using the plurality of data signal lines each of which has been set for the common input/output use in response to the continuous read instructions;
before transmitting the second data, setting each of the plurality of data signal lines to be a data signal line for common input/output use and setting the data synchronization line to be a data synchronization signal line for common input/output use, so that the second data is written to the semiconductor storage device by using the plurality of data signal lines each of which has been set for the common input/output use in response to the continuous write instructions; and before transmitting the third data, setting a first group of the plurality of data signal lines each to be a data signal line for input only use and a second group of the plurality of data signal lines each to be a data signal line for output only use and setting the data-synchronization signal line corresponding to the first group to be a data-synchronization signal for input only use, and setting the data-synchronization signal line corresponding to the second group to be a data-synchronization signal for output only use, so that the third data is written to the semiconductor storage device by using the first group of the plurality of data signal lines each of which has been set for input only use in response to the write instruction and the fourth data is read out from the semiconductor storage device by using the second group of the plurality of data signal lines each of which has been set for output only use in response to the read instruction, independently.

14. The method as claimed in claim 13, the method further comprising:
before transmitting one of the first data, the second data, the third data, and the fourth data, receiving a command for setting the plurality of data signal lines and bits of address signal specifying a type to which the plurality of data signal lines are set.

15. The method as claimed in claim 14, the method further comprising:
decoding the command to produce a decoded command;
storing the bits of address signal into a register in response to the decoded command; and
setting the plurality of data signal lines to be the data signal line for common input/output use, the data signal line for output-only use, or the data signal line for input-only use, based on the bits.

16. The method as claimed in claim 13,
wherein the plurality of data signal lines each includes a data buffer including an input buffer and an output buffer;
wherein the setting each of the plurality of data signal lines to be a data signal line for common input/output use comprises: activating the input buffers of the plurality of data buffers and the output buffers of the plurality of data buffers; and
wherein the setting the first group of the plurality of data signal lines each to be the data signal line for input-only use and the second group of the plurality of data signal lines each to be the data signal line for output-only use comprises:
activating the input buffers of the first group of the data buffers and inactivating the output buffers of the first group of the data buffers, and inactivating the input buffers of the second group of the data buffers and activating the output buffers of the second group of the data buffers.

* * * * *